United States Patent
Dahl

(10) Patent No.: US 10,757,908 B2
(45) Date of Patent: Sep. 1, 2020

(54) MODULAR LIVESTOCK STALL

(71) Applicant: Amity Technology, LLC, Fargo, ND (US)

(72) Inventor: Brian E. Dahl, Fargo, ND (US)

(73) Assignee: Amity Technology, LLC, Fargo, ND (US)

(*) Notice: Subject to any disclaimer, the term of this patent is extended or adjusted under 35 U.S.C. 154(b) by 305 days.

(21) Appl. No.: 15/491,421

(22) Filed: Apr. 19, 2017

(65) Prior Publication Data

US 2017/0295746 A1 Oct. 19, 2017

Related U.S. Application Data

(60) Provisional application No. 62/324,729, filed on Apr. 19, 2016.

(51) Int. Cl.
| | | |
|---|---|---|
| *A01K 1/00* | (2006.01) | |
| *F16B 7/18* | (2006.01) | |
| *F24F 13/06* | (2006.01) | |

(52) U.S. Cl.
CPC .......... *A01K 1/0011* (2013.01); *A01K 1/0005* (2013.01); *A01K 1/0035* (2013.01);
(Continued)

(58) Field of Classification Search
CPC ............ E04H 17/1426; E04H 17/1439; E04F 2011/1819; E04F 2011/1821;
(Continued)

(56) References Cited

U.S. PATENT DOCUMENTS

| | | | | |
|---|---|---|---|---|
| 189,543 A | * | 4/1877 | Van Dorn | ........... E04H 17/1443 |
| 2,669,467 A | * | 2/1954 | Wolferz | ............. F16L 23/0286 |
| | | | | 285/416 |

(Continued)

FOREIGN PATENT DOCUMENTS

EP 2 818 610 * 12/2014 ............. E04H 17/14

OTHER PUBLICATIONS

"Horse Stall Kit: Installation Guide," Triton Barn Systems, May 18, 2008, http://www.tritonbarns.com/horse_stalls_install_instructions.php, obtained Feb. 27, 2017, 15 pages.
(Continued)

*Primary Examiner* — Michael P Ferguson
(74) *Attorney, Agent, or Firm* — Mai-Tram D. Lauer; Westman, Champlin & Koehler, P.A.

(57) ABSTRACT

A connector includes a cube, a first cylinder and a second cylinder. The cube includes first, second, third, fourth, fifth and sixth faces. The cube includes a first bore therein, the first bore having a first longitudinal axis. The first cylinder extends from the first face; the first cylinder includes a first hole therein, the first hole having a second longitudinal axis. The second cylinder extends from the second face; the second cylinder includes a second hole therein, the second hole having a third longitudinal axis. The first, second and third longitudinal axes are parallel to each other. In another aspect, a vent element includes a first piece and a second piece that is a mirror image of the first piece, each of the pieces having upper, middle and lower portions. In yet another aspect, a system is configured for removable attachment of an elongated tube to a surface.

18 Claims, 30 Drawing Sheets

(52) U.S. Cl.
CPC ............ *A01K 1/0064* (2013.01); *F16B 7/185* (2013.01); *F24F 13/06* (2013.01)

(58) Field of Classification Search
CPC ......... Y10T 403/7005; Y10T 403/7007; Y10T 403/33; F16B 9/02; F16B 9/052; F16B 9/056; F16B 2200/503; A01K 1/0094
USPC .......................................... 256/65.11, 65.12
See application file for complete search history.

(56) References Cited

U.S. PATENT DOCUMENTS

| | | | |
|---|---|---|---|
| 3,009,719 A * | 11/1961 | Otto | F16B 12/34 403/252 |
| 3,802,393 A | 4/1974 | Naylor | |
| 3,901,613 A | 8/1975 | Andersson | |
| 4,030,246 A | 6/1977 | Naylor | |
| 4,273,072 A * | 6/1981 | Choisel | A01K 1/0005 119/516 |
| 4,552,094 A * | 11/1985 | Johnson | A01K 1/0005 119/516 |
| 4,683,683 A * | 8/1987 | Block | B24D 9/085 451/509 |
| 4,883,256 A * | 11/1989 | Hebda | E04H 17/1443 256/22 |
| 4,922,669 A | 5/1990 | De Pas | |
| 6,053,480 A * | 4/2000 | De Guise | E04F 11/181 256/22 |
| 6,494,438 B1 * | 12/2002 | Noirot | E04F 11/1812 256/59 |
| 7,434,789 B2 * | 10/2008 | Crumrine | E04H 17/1439 256/22 |
| 7,654,571 B2 * | 2/2010 | Gabbianelli | B23K 33/008 280/781 |
| 8,601,766 B2 * | 12/2013 | Harrah | A01K 1/0094 52/455 |
| 2011/0012392 A1 | 1/2011 | Herschler | |
| 2012/0301215 A1 | 11/2012 | Huang | |
| 2015/0076434 A1 * | 3/2015 | Garza Montemayor | E04H 17/1439 256/22 |

OTHER PUBLICATIONS

"Horse Stall Kit: Modular Horse Stall Kits," by Triton Barn Systems, http://www.tritonbarns.com/kit_stalls.php, obtained Feb. 27, 2017, 46 pages.

"Horse Stall Package Overview", Armour Companies Store, http://www.armourgates.com/horse-stall-packages, , obtained Feb. 27, 2017, 3 pages.

International Search Report and Written Opinion dated Sep. 8, 2017 for International Application No. PCT/US2017/028325.

\* cited by examiner

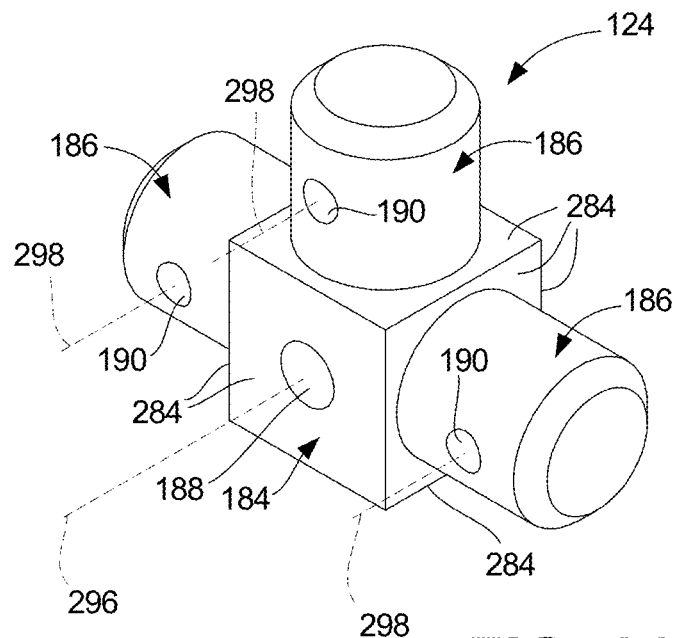
FIG. 14
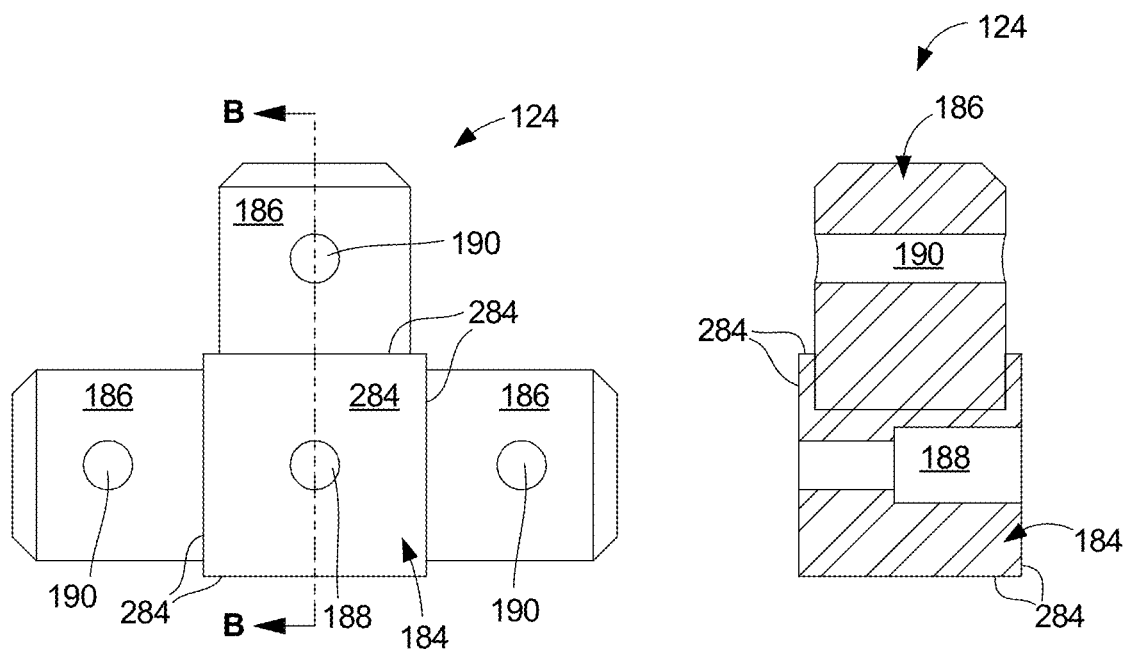
FIG. 14A  FIG. 14B

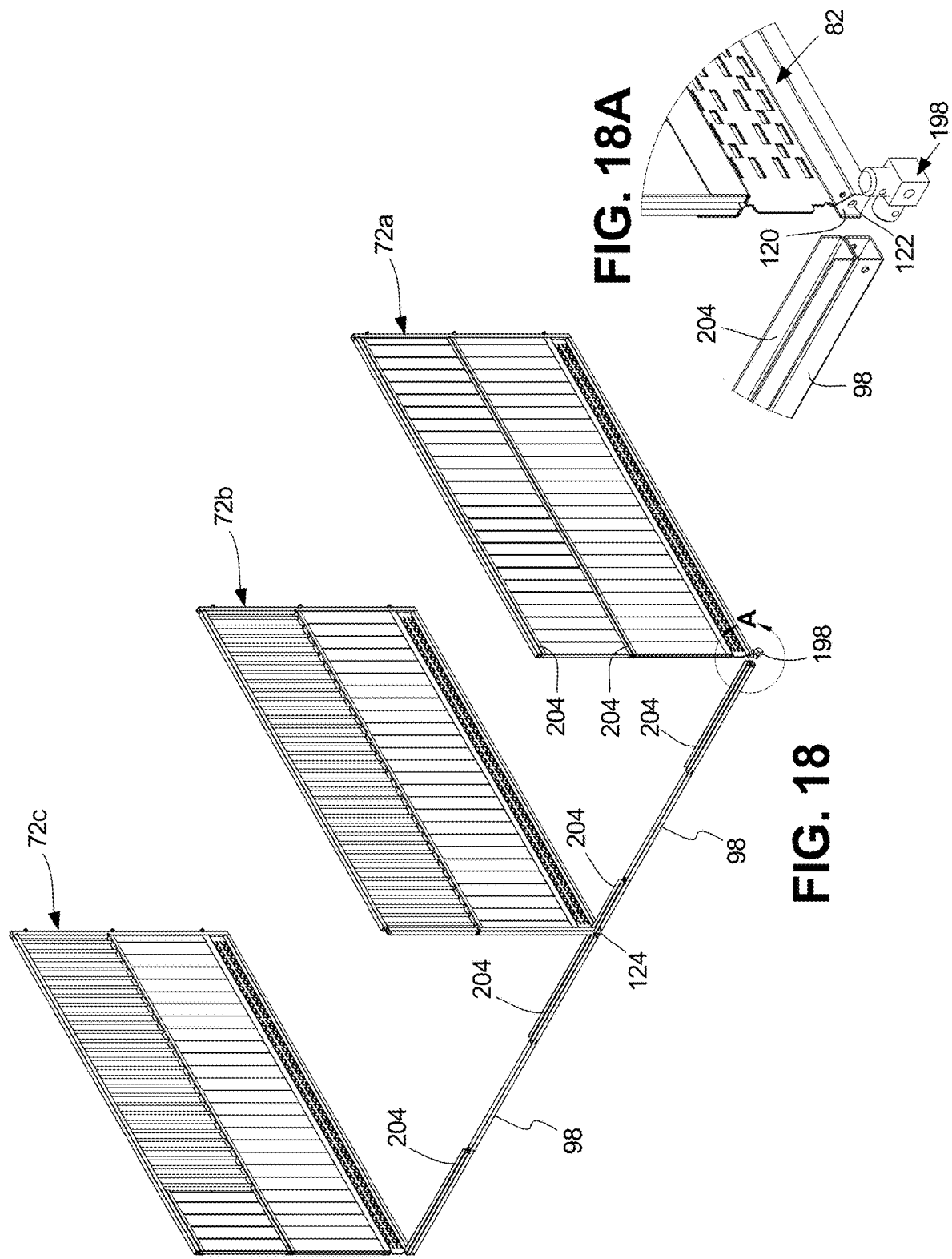

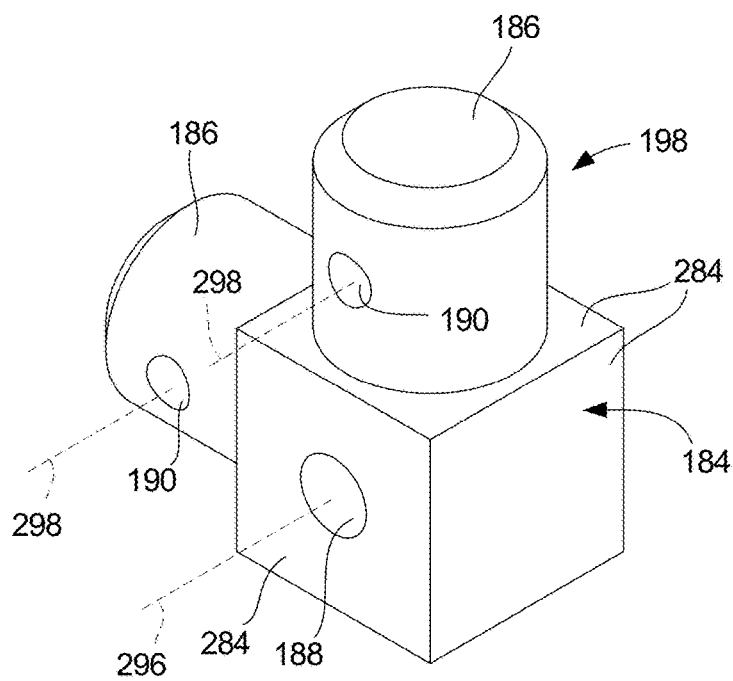
FIG. 19
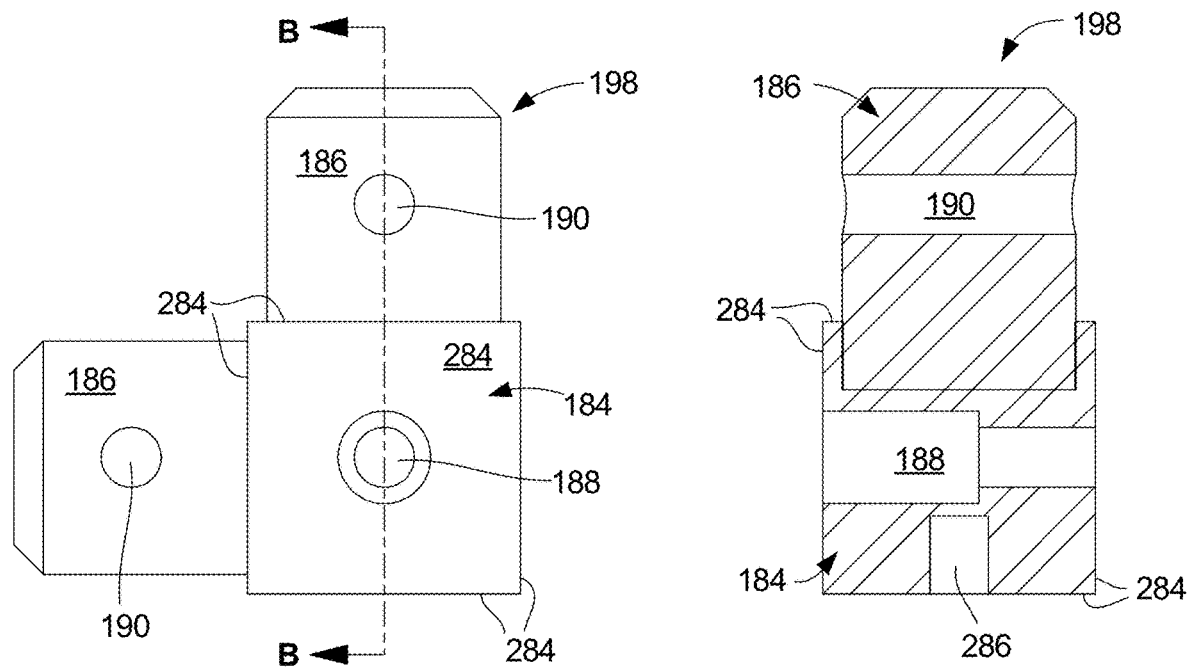
FIG. 19A  FIG. 19B

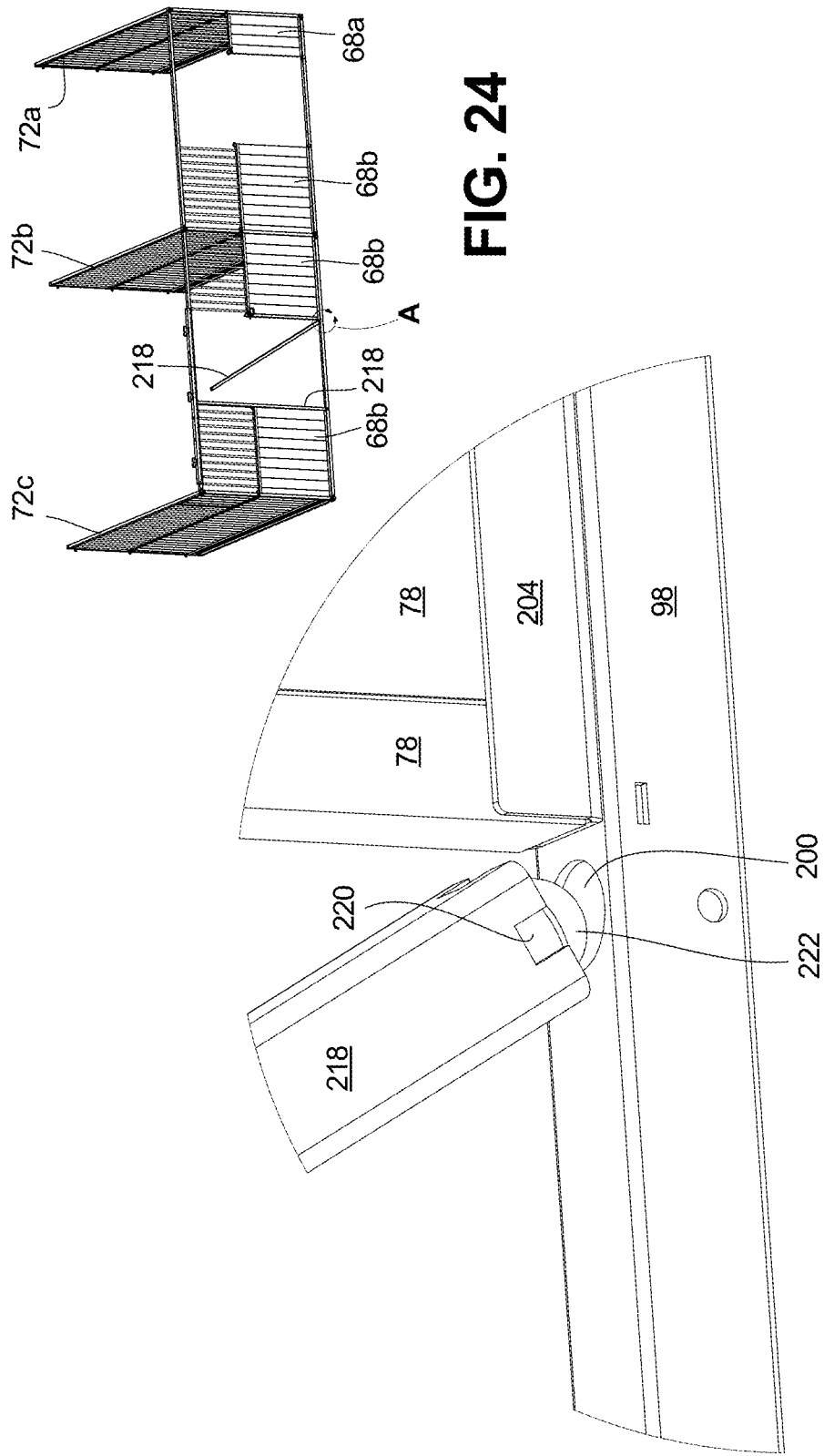

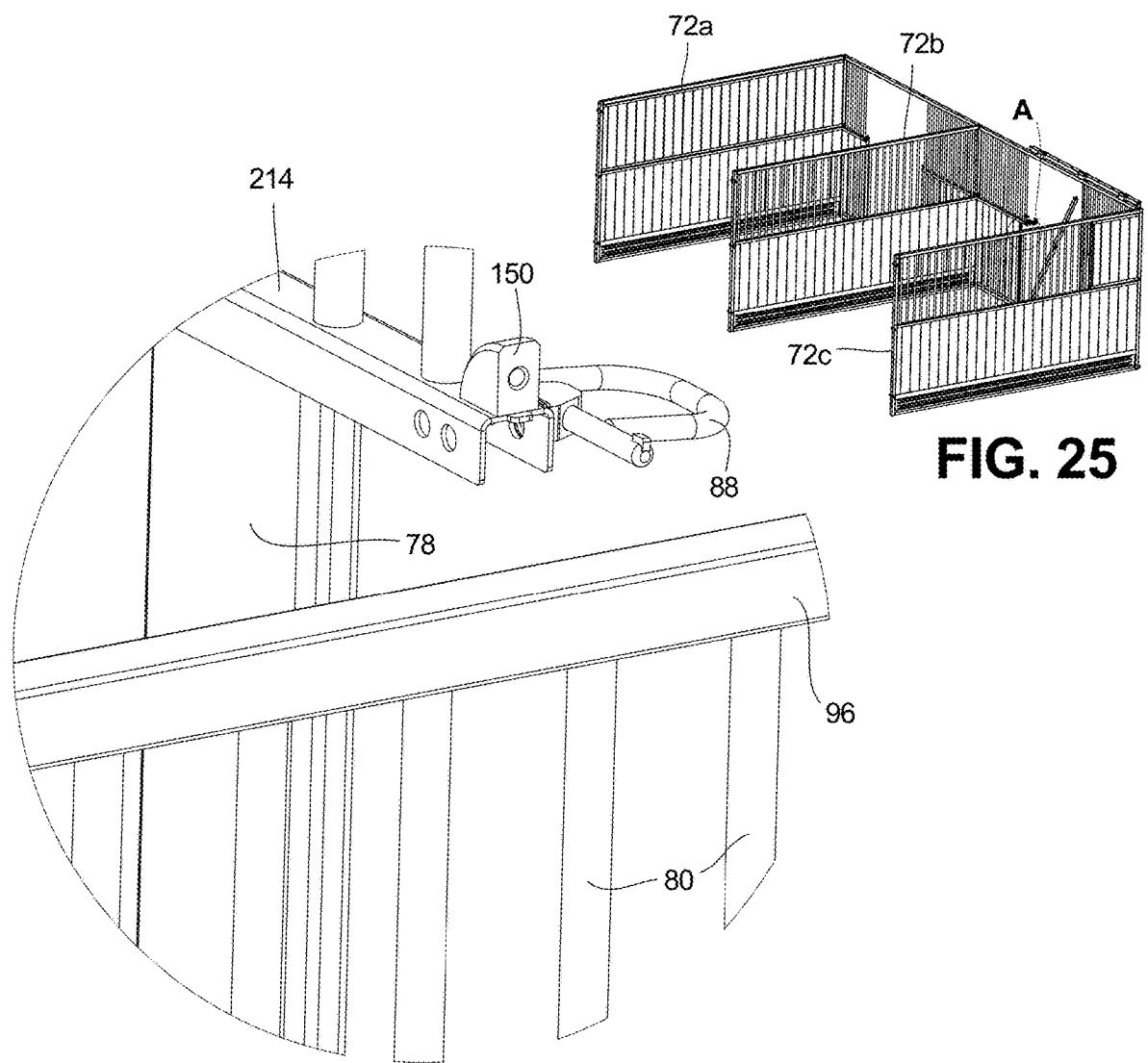

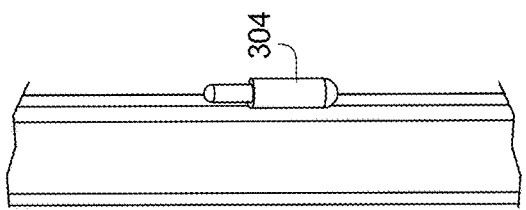
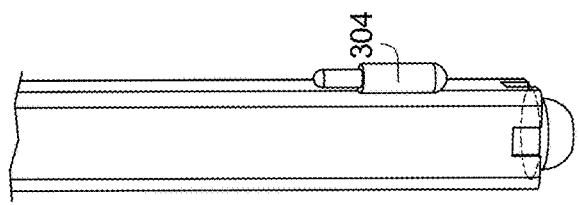
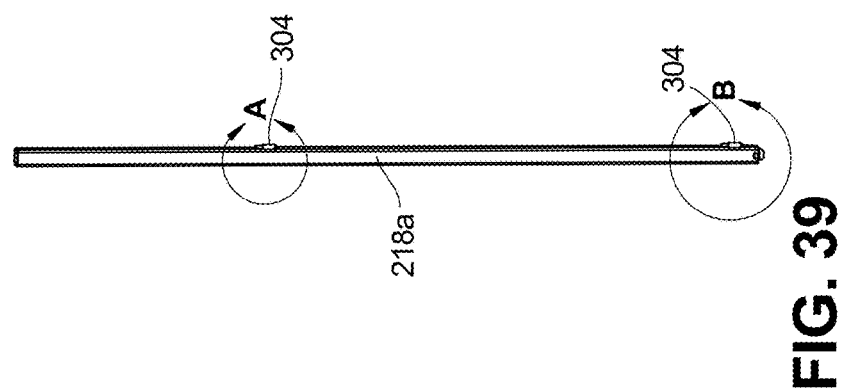
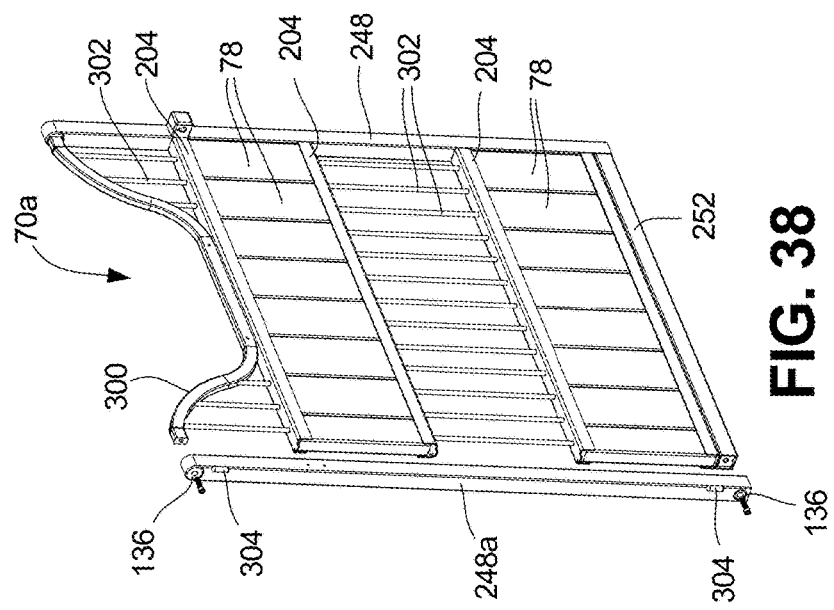

MODULAR LIVESTOCK STALL

CROSS-REFERENCE TO RELATED APPLICATION

This application claims the benefit of priority from U.S. Provisional Patent Application No. 62/324,729 filed Apr. 19, 2016, which is fully incorporated hereby by reference.

BACKGROUND

In a livestock building, individual stalls are commonly constructed to house a single animal or a small group of animals including, for example, a mother and her offspring. Such construction is usually an extensive undertaking, requiring a livestock manager to obtain materials, draw up plans, and hire a contractor to manage workers for a construction project. Commonly used construction methods require high levels of skill and coordination to build animal stalls from raw materials. Moreover, obtaining the needed materials from a variety of sources is often a complicated and time-consuming endeavor.

SUMMARY

In one aspect, this disclosure describes a connector including a cube, a first cylinder and a second cylinder. The cube includes first, second, third, fourth, fifth and sixth faces. The cube includes a first bore therein, the first bore having a first longitudinal axis. The first cylinder extends from the first face; the first cylinder includes a first hole therein, the first hole having a second longitudinal axis. The second cylinder extends from the second face; the second cylinder includes a second hole therein, the second hole having a third longitudinal axis. The first, second and third longitudinal axes are parallel to each other.

In another aspect, a vent element includes a first piece and a second piece that is a mirror image of the first piece. The first piece has a first upper portion, a first middle portion and a first lower portion. The second piece has a second upper portion, a second middle portion and a second lower portion. The first and second pieces are joined together at their respective first and second middle portions. Each of the first and second middle portions includes a plurality of apertures therethrough. The first and second upper portions form a first channel and the first and second lower portions form a second channel.

In yet another aspect, a system is configured for removable attachment of an elongated tube to a surface. The elongated tube has a longitudinal axis that is substantially orthogonal to the surface. The tube has first and second opposed ends. The tube further includes, at the first end, opposed first and second notches defining corresponding first and second tabs and first and second slots. The surface includes first and second apertures configured to allow passage of respective first and second tabs.

This disclosure, in its various combinations, either in apparatus or method form, may also be characterized by the following listing of items:

1. A connector including:
a cube including first, second, third, fourth, fifth and sixth faces; the cube including a first bore therein, the first bore having a first longitudinal axis;
a first cylinder extending from the first face, the first cylinder including a first hole therein, the first hole having a second longitudinal axis; and
a second cylinder extending from the second face, the second cylinder including a second hole therein, the second hole having a third longitudinal axis;
wherein the first, second and third longitudinal axes are parallel to each other.
2. The connector of item 1 wherein the first and second faces are parallel to each other.
3. The connector of any of items 1-2 wherein the first and second faces are orthogonal to each other.
4. The connector of any of items 1-3 wherein the first bore extends through the cube.
5. The connector of any of items 1-4 wherein:
the first hole extends through the first cylinder; and
the first hole extends through the first cylinder.
6. The connector of any of items 1-5, wherein the first bore is located on a third face of the cube.
7. The connector of item 6, further including a second first bore is located on a fourth face of the cube.
8. The connector of any of items 1-7, further including:
a third cylinder extending from the third face, the third cylinder including a third hole therein, the third hole having a fourth longitudinal axis;
wherein the first, second, third and fourth longitudinal axes are parallel to each other.
9. A vent element including:
a first piece having a first upper portion, a first middle portion and a first lower portion; and
a second piece that is a mirror image of the first piece, the second piece having a second upper portion, a second middle portion and a second lower portion;
wherein the first and second pieces are joined together at their respective first and second middle portions, wherein each of the first and second middle portions includes a plurality of apertures therethrough;
wherein the first and second upper portions form a first channel; and
wherein the first and second lower portions form a second channel.
10. The vent element of item 9 further including a hook located on each of the first and second middle portions.
11. The vent element of any of items 9-10 further including a wall attached to the first and second lower portions at an end of the second channel.
12. The vent element of item 11 wherein the wall includes a hole therethrough.
13. The vent element of any of items 9-12 wherein at least a part of the first lower portion extends at an angle from the first middle portion.
14. The vent element of any of items 9-13 wherein a combined area of the plurality of apertures includes at least about 25% of an area of the first middle portion.
15. A system configured for removable attachment of an elongated tube to a surface, the system including:
the elongated tube having a longitudinal axis that is substantially orthogonal to the surface, the tube having first and second opposed ends, the tube further including, at the first end, opposed first and second notches defining corresponding first and second tabs and first and second slots; and
the surface including first and second apertures configured to allow passage of respective first and second tabs.
16. The system of item 15 wherein:
the tube has a substantially circular cross sectional shape; and
each of the first and second apertures has a substantially semicircular shape.

17. The system of any of items 15-16 wherein the surface is located on a member having a thickness dimension, and wherein each of the first and second slots has a height substantially equal to the thickness dimension.

18. The system of any of items 15-17 wherein at least one of the first and second tabs further includes a detent.

19. The system of any of items 15-18 wherein the tube further includes a ring surrounding the second end of the tube.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views. It is contemplated that all descriptions are applicable to like and analogous structures throughout the several embodiments.

FIG. 4A is an enlarged view of the encircled end portion "A" of FIG. 4.

FIG. 4B is an enlarged view of the encircled end portion "B" of FIG. 4.

FIG. 5A is an enlarged view of the encircled portion of FIG. 5.

FIG. 6A is an enlarged view of the encircled portion of FIG. 6.

FIG. 7A is an enlarged view of the encircled portion of FIG. 7.

FIG. 8A is an enlarged view of the encircled portion of FIG. 8.

FIG. 13A is an enlarged view of the encircled portion of FIG. 13.

FIG. 14 is a perspective view of an exemplary four-way connector.

FIG. 14A is a side elevation view of the four-way connector of FIG. 14.

FIG. 14B is a cross-sectional view of the four-way connector, taken along line B-B of FIG. 14A.

FIG. 18 shows the use of a three-way connector with the vent element and a front floor tube.

FIG. 18A is an enlarged view of the encircled portion of FIG. 18.

FIG. 19 is a perspective view of an exemplary three-way connector.

FIG. 19A is a side elevation view of the three-way connector of FIG. 19.

FIG. 19B is a cross-sectional view of the three-way connector, taken along line B-B of FIG. 19A.

FIG. 20A is an enlarged view of the encircled portion "A" of FIG. 20.

FIG. 20B is an enlarged view of the encircled portion "B" of FIG. 20.

FIG. 21A is an enlarged view of the encircled portion of FIG. 21.

FIG. 24 is a front perspective view showing installation of a door jamb to the first front wall portion.

FIG. 24A is an enlarged view of the encircled portion of FIG. 24.

FIG. 25 is a perspective view showing installation of a door latch to the first front wall portion.

FIG. 25A is an enlarged view of the encircled portion of FIG. 25.

FIG. 38 shows a second gate side frame tube positioned for connection.

FIG. 39 is a perspective view of a door jamb configured for use with the gate of FIGS. 31-38.

FIG. 39A is an enlarged view of the encircled portion "A" of FIG. 39.

FIG. 39B is an enlarged view of the encircled portion "B" of FIG. 39.

FIG. 40 shows a grilled window cover that can be custom fit to an existing window opening.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

Figure 8:
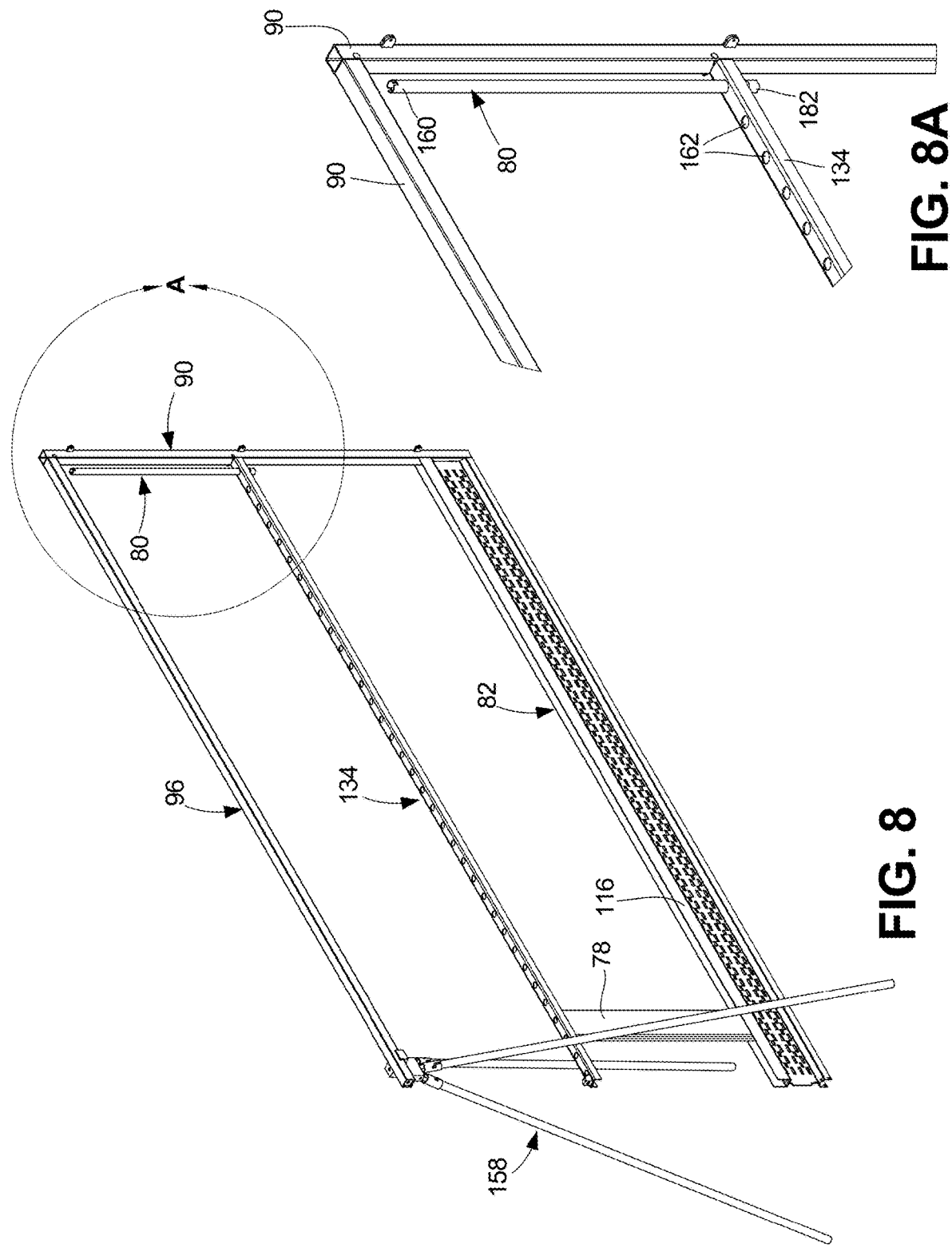
FIG. 8 is a perspective view of the components of FIG. 7 in a connected configuration, and with a grill tube inserted through the side wall channel and positioned for connection to the top side wall tube.

The present disclosure describes modular components that can be assembled from various construction kits to allow for easy and quick construction of livestock stalls. The described elements are measured and machined to fit precisely together, thereby eliminating many labor-intensive steps in a stall construction process. Moreover, essential materials for the construction process are provided, thereby simplifying a materials procurement process for stall construction. The completed stall assemblies are durable enough to withstand many years of use with large animals. However, each of the elements for construction is designed to have a light enough weight (e.g., under about 60 pounds) and compact enough form that it can be comfortably handled by just one or two people. As shown in the attached drawing figures, the construction process can be accomplished easily by two people, or by one person with the aid of a support element such as a scaffold or stand as shown in FIG. 8, for example.

Figure 1:
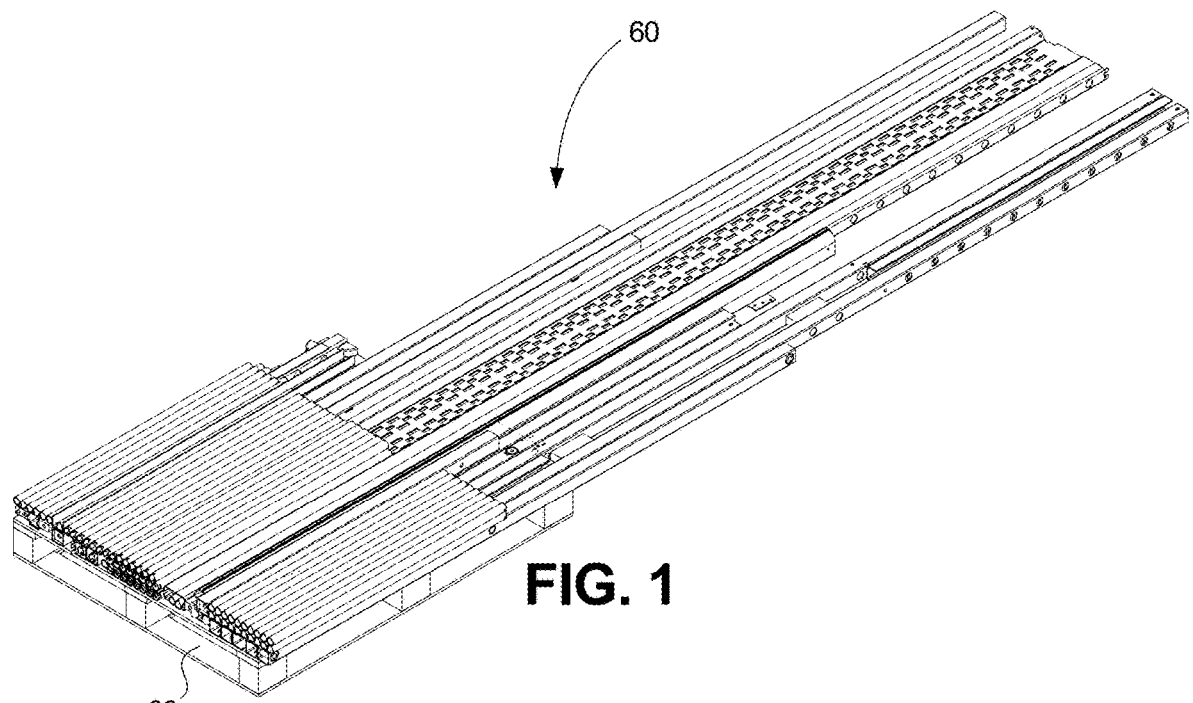
FIG. 1 is a perspective view of an exemplary kit of the present disclosure for constructing a livestock stall or portion thereof.
Figure 2:
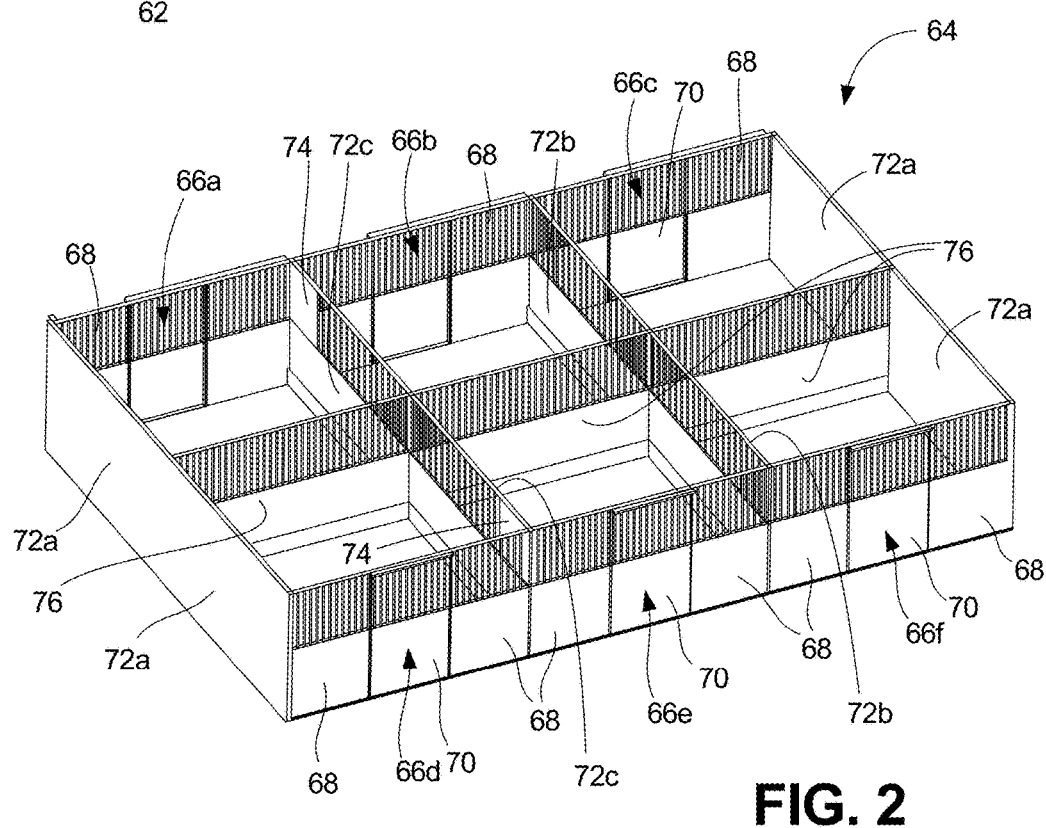
FIG. 2 is a top perspective view of a plurality of connected modular livestock stalls.

The present disclosure describes a kit including elements for the modular construction of livestock stall assemblies. As shown in FIG. 1, an exemplary kit 60 can be arranged on a pallet 62 for ease of transportation and storage. As shown in FIG. 2, a plurality of kits 60 can be used to construct an arrangement 64 of individual livestock stalls 66. In an exemplary embodiment, an individual stall is about 12 feet wide, about 12 feet deep, and about 7 feet high. However, other sizes are also suitable. In the illustrated embodiment, arrangement 64 includes six individual stalls 66a through 66f. In the illustrated arrangement 64, three stalls 66a through 66c face in a first direction (i.e., their doors 70 are all on the same side of arrangement 64) and are adjacent back-to-back to three stalls 66d through 66f that face a second direction. Thus, the arrangement 64 can be installed in a central area of a livestock building. In the illustrated arrangement 64, each of the stalls 66a through 66f includes a front wall 68 having door 70. Some side walls 72b, 72c are shared between two stalls 66, while other side walls 72a are not shared between stalls 66. Some of the side walls 72c may have a privacy wall feature 74, while other side walls 72a, 72b do not. Such a privacy wall feature 74 is especially useful in stalls for housing animals that feed better when they are not in view of animals in neighboring stalls. In an exemplary construction of arrangement 64, such a privacy wall feature 74 would be located at a corner of a stall 66 in which a feed bucket or other feed station is positioned.

In the illustrated embodiment, side walls 72a are substantially solid. In contrast, side walls 72b, which can be placed between neighboring stalls 66, in some embodiments have a substantially open top portion that allows for the passage of light and air. Yet other side walls 72c, which can be positioned between neighboring stalls, have a top portion that is generally open, as well as a privacy wall feature 74. It is contemplated that any type of side wall 72 may be located on any side of any stall 66 in any desired arrangement of stalls. Moreover, stall walls and doors having other combinations of features that are not explicitly shown may also be used. Many other combinations of disclosed elements can be devised following the teachings of this disclosure.

In an exemplary embodiment, each of front walls 68, including door 70, also has a substantially open top portion. In an exemplary arrangement 64, two stalls that face in opposite directions share a back wall 76 that also includes a substantially open top portion in an exemplary embodiment and can be constructed similarly to side wall 72*b*. However, it is contemplated that back wall 76 can be substantially solid, similar to the illustrated walls 72*a*, or partially solid, as with walls 72*c*.

Figure 3:
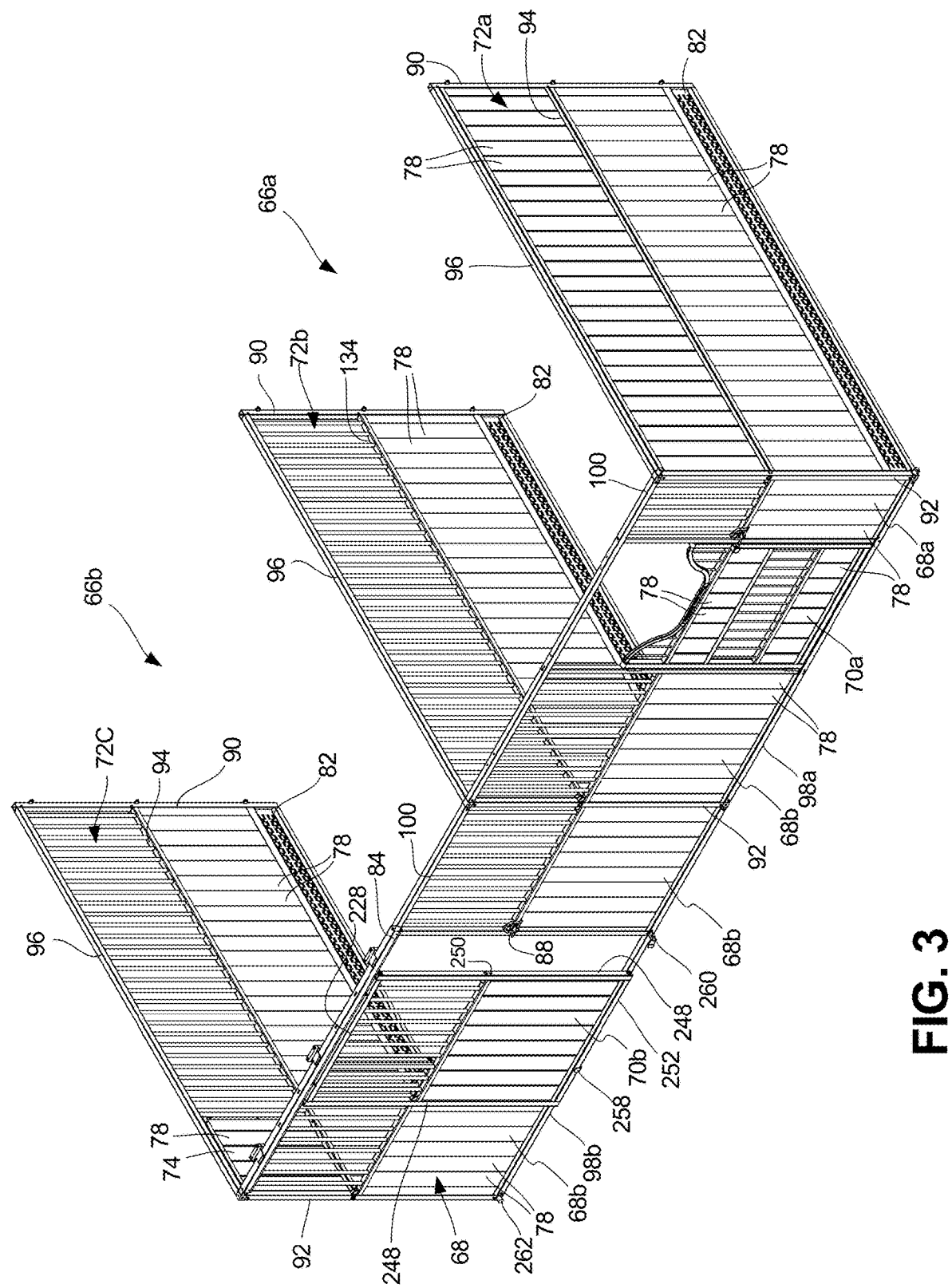
FIG. 3 is a perspective view of two exemplary constructed livestock stalls of the present disclosure.

FIG. 3 is a perspective view of an assembly of two exemplary stalls 66*a* and 66*b*. Stalls 66 need not be installed in a freestanding arrangement, as shown in arrangement 64 of FIG. 2. Rather, side walls 72 and front wall 68 can be installed against an existing wall of a building (such as wall 104 shown in FIG. 40), which then serves as the back wall of the stall 66. In the illustrated embodiment, the stalls 66*a* and 66*b* are configured to abut an existing wall of the building, so that no modular back wall 76 is required. The two stalls 66*a* and 66*b* show some variations illustrating the modularity and customization available using the described components. It is to be understood that the described components can also be combined in other ways to meet the needs of a particular user and building. For example, in stall 66*a*, wall 72*a* is substantially solid; front wall 68 includes a swinging gate 70*a*; and wall 72*b*, shared with stall 66*b*, has a substantially open top section. For stall 66*b*, front wall 68 includes a sliding door 70*b* and side wall 72*c* includes privacy wall 74 on a portion of the top section. Stall 66*b* is larger than stall 66*a*; in the illustrated embodiment, 66*b* uses two wider front wall sections 68*b*, while stall 66*a* uses one wider front wall section 68*b* and one narrower front wall section 68*a*.

In an exemplary embodiment, at least a portion of front wall 68, gate or door 70, and side walls 72 is substantially solid and is constructed from a plurality of boards 78. In contrast, the generally open top portions of front wall 68, gate or door 70, and side walls 72 includes grill tubes 80. In an exemplary embodiment, each of boards 78 includes a tongue on one side edge and a groove on the opposite side edge, so that adjacent boards fit together in a known manner. Privacy wall feature 74 may also include such boards 78. Moreover, while grill tubes 80 are described as having a substantially cylindrical tubular shape in one embodiment, it is contemplated that the substantially open top portions of the walls of a livestock stall may include other elements that are not tubes. For example, other generally open structures may include a grid, screen or mesh configuration. In an exemplary embodiment, some or all of front wall 68, side wall 72 and back wall 76 may include a vent element 82 on a lower portion of the respective wall.

In an exemplary embodiment of stall 66*a*, gate 70*a* is a swinging door that is pivotally attached by hinges to a door jamb 218 (shown in more detail in FIGS. 24, 24A and 39-39B). In an exemplary embodiment of stall 66*b*, door 70*b* is a sliding door that is slidably received within door track 84 to hang therefrom. Accordingly, very little clearance space is required on an interior or exterior side of door 70*b* for its operation. It is contemplated that any style of door 70*a* may be used for any particular stall 66. Moreover, in some cases, it may be desirable to omit a door and merely leave an open door wall between front wall sections 68*a*, 68*b*. Moreover, decorative elements such as finials 86 (shown in FIG. 26) may be provided on stall 66.

In an exemplary embodiment, each of side walls 72 is connected to rear upright support 90 and front upright support 92. Spanning a distance between rear upright support 90 and front upright support 92 are vent element 82, side channels 94, 134 and side top tube 96. Spanning a distance between the two front upright supports 92 are front floor tube 98 and front top tube 100. While frame members of an exemplary stall 66 are described generally as tubes, it is contemplated that other elongated structural members can be used, such as rods, channels, and angle iron pieces, for example.

Returning to FIG. 1, in an exemplary kit 60, elements are included for the construction of front wall 68, gate/door 70, and just a single side wall 72. These components are sufficient for installation of a stall 66 in a corner of an existing building. Additionally, only these components would be required to build a second adjacent stall, in a case where a first stall has already been completed, and wherein the first and second stalls would share a common side wall 72. Moreover, in an exemplary embodiment, kit 60 does not include boards 78, which are readily obtainable through sources such as lumberyards. Such a configuration of kit 60 allows the weight of kit 60 to be about 625 pounds and allows kit 60 to have a compact form. For example, in an exemplary embodiment, it is possible to fit about sixty-four kits 60 in a semi-trailer container that is about 50 feet long. It is contemplated that other kits can be designed to provide the elements required for construction of entire stalls 66 or portions thereof, including variations on the type of side wall, back wall, front wall, or door/gate. Optional accessory kits can also be provided including parts such as finials 86, for example. Moreover, a stall construction kit can be customized for a particular customer, in accordance with the customer's specific request.

Figure 4:
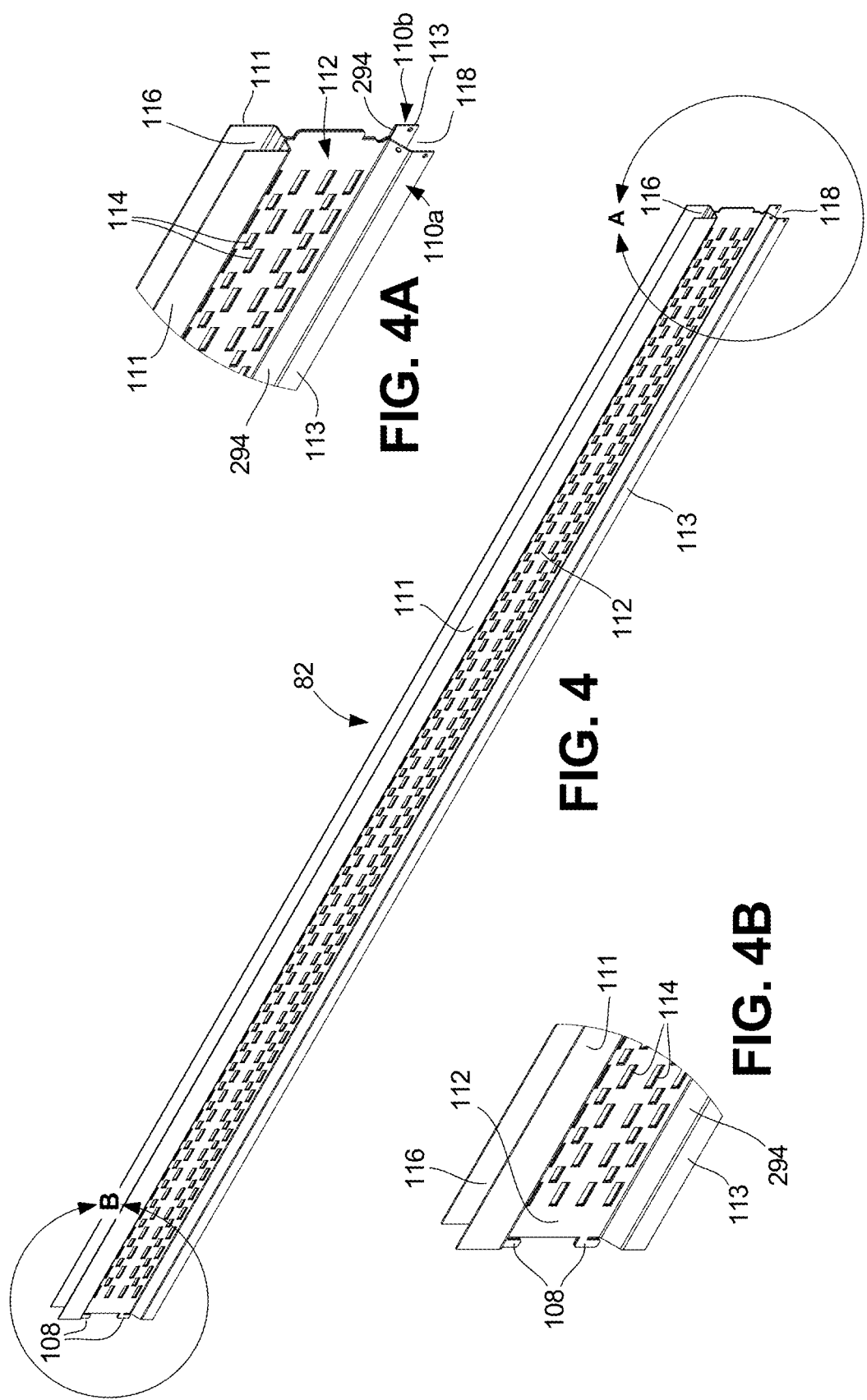
FIG. 4 is a perspective view of an exemplary vent element.

FIG. 4 is a perspective view of an exemplary vent element 82. FIG. 4A is an enlarged view of the encircled end portion "A" of FIG. 4. FIG. 4B is an enlarged view of the encircled end portion "B" of FIG. 4. In an exemplary embodiment, vent element 82 is formed from two bent and stamped sheet pieces 110*a* and 110*b* that are formed, such as from stainless steel, as mirror images of each other. Each of pieces 110*a*, 110*b* includes upper portion 111, middle portion 112, and lower portion 113. Pieces 110*a*, 110*b* are secured together at middle portion 112. Each sheet metal piece 110*a*, 110*b* includes apertures 114 through middle portion 112 to allow for air flow through vent element 82. While apertures 114 are illustrated as elongated slots in an exemplary embodiment, it is contemplated that an arrangement of apertures 114 can have another configuration, such as substantially square apertures in a grid formation, for example. Moreover, the slots may be arranged vertically rather than horizontally. Many other configurations for allowing air flow through a middle portion 112 of vent element 82 are also suitable including, for example, apertures having circular, semicircular, elliptical shapes and specialty shapes, such as the outlines of horses or leaves for example. In an exemplary embodiment, a combined area of the plurality of apertures 114 includes at least about 25% of an area of the middle portion 112, up to about 50% of an area of the middle portion 112. It is contemplated that other ranges are also possible, taking into consideration strength properties of the materials and construction of vent element 82.

In an exemplary embodiment, the two sheet metal pieces 110*a*, 110*b* are attached together at middle portion 112 by lamination, including the use of adhesive and pressure. It is contemplated that other attachment methods can also or alternatively be used, such as the use of mechanical fasteners and welding, for example. An exemplary vent element 82 includes an open upper channel 116 formed by upper portions 111 of pieces 110a, 100b and an open lower channel 118 formed by lower portions 113 of pieces 110a, 100b. Upper channel 116 is configured to accept boards 78, as shown in FIGS. 3 and 8. Lower portions 113 of lower channel 118 include angled side walls 294 (i.e., angled from middle portions 112) to allow fluid and debris to flow or fall off by gravity. In an exemplary embodiment, one end of lower channel 118 is closed by end wall 120 (shown in FIG. 18A), which is welded into channel 118 and includes an aperture 122. As shown in FIG. 18A, aperture 122 of end wall 120 is provided to accept a fastener for connection to a connector, which is also attached to front upright support 92. Especially when installing vent element 82 on a floor that may be uneven, such as a dirt floor, for example, channel 118 can be substantially filled by a wooden beam (not shown), for example, to provide additional structural support to keep vent element 82 level on an uneven floor surface. Such a beam would also prevent warping and bending of the fins of lower portions 113. In an exemplary embodiment, such a beam can be formed by ripping down a 2×4 piece of treated lumber to fit into channel 118.

Figure 5:
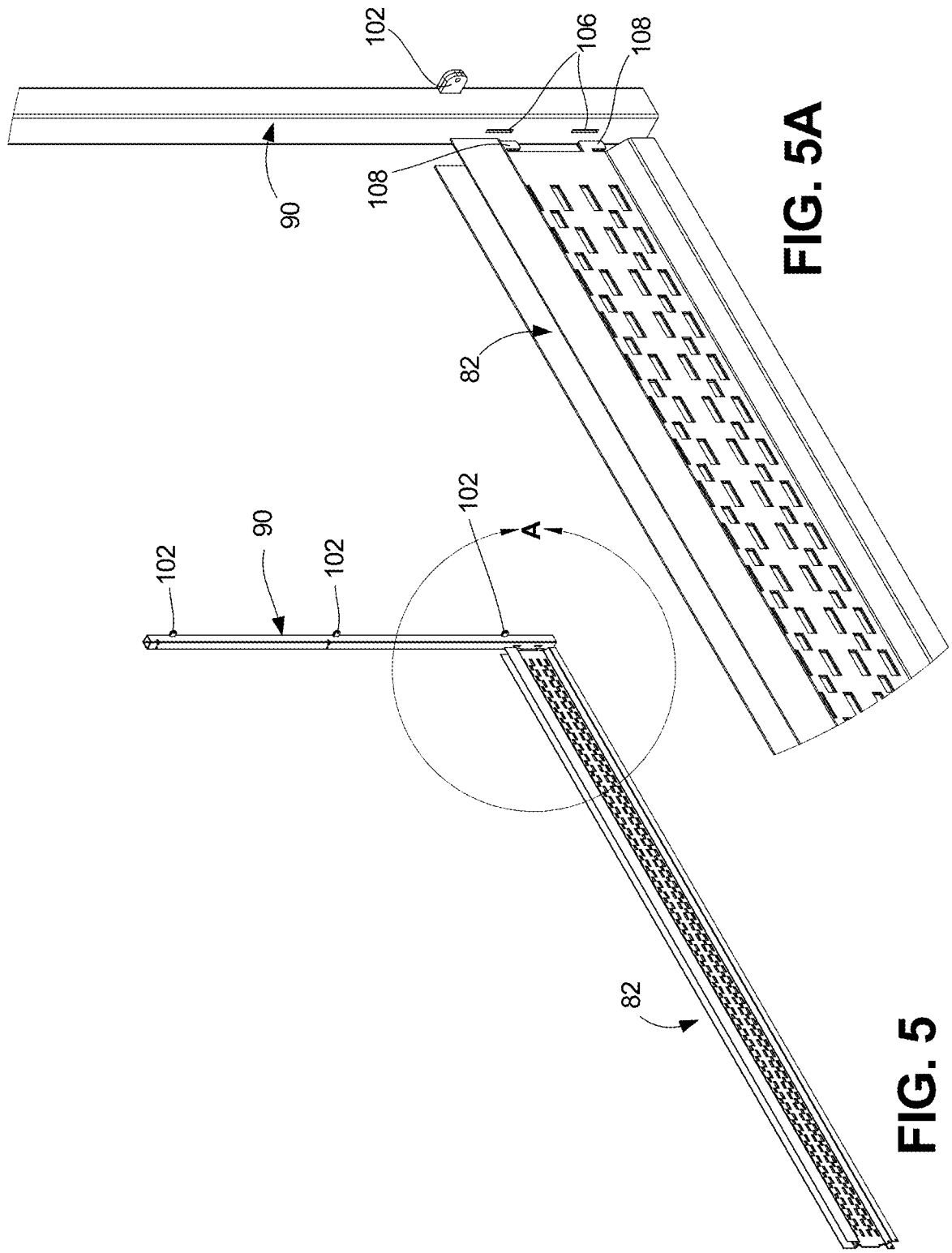
FIG. 5 is a perspective view of an upright support and a lower vent element positioned for mutual connection.

FIGS. 5 and 5A shown rear upright support 90 and lower vent element 82 positioned for mutual connection. Rear upright support 90 has tabs 102 for connection to an existing wall (such as wall 104 shown in FIG. 40) of a livestock building. In a case where a livestock stall 66 does not have its own back wall 76 but rather is attached to an existing wall of a livestock building, rear upright support 90 can be attached to the wall by securing fasteners through tabs 102 of rear upright support 90 and into the wall. Known suitable fasteners include bolts, screws, nails and others. In an exemplary embodiment, tabs 102 are welded to rear upright support 90 at discreet intervals. In an exemplary embodiment, a bottom portion of rear upright support 90 includes slots 106 for the receipt of hooks 108 provided on one end of vent element 82. While tabs 102 are shown as being fixed to support 90, it is also contemplated that similar tabs may be provided on a bracket that removably wraps around support 90.

Figure 6:
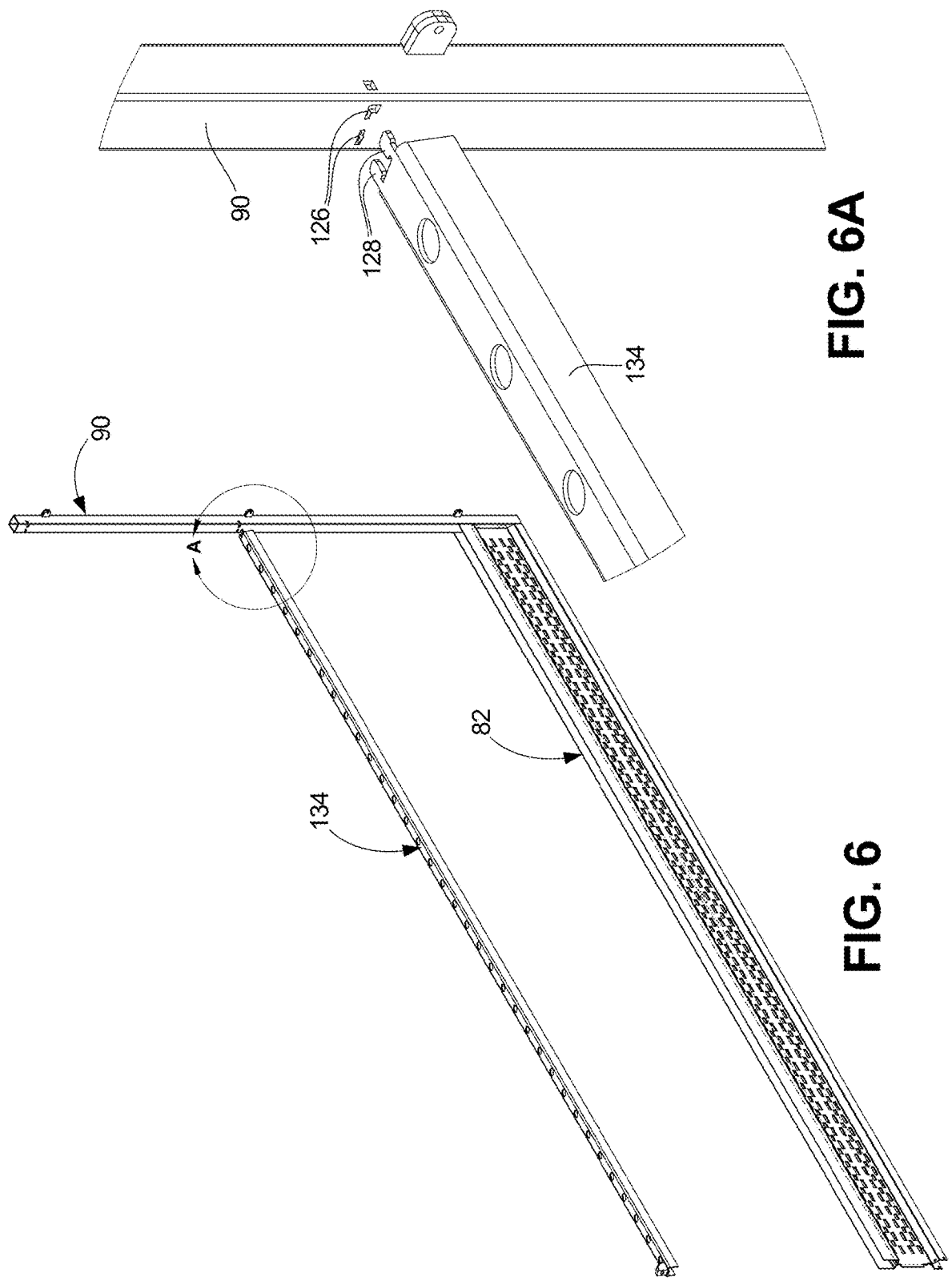
FIG. 6 is a perspective view of the rear support tube and vent element of FIG. 5 in a connected configuration, and with a side wall channel positioned for connection to the rear support tube.
Figure 7:
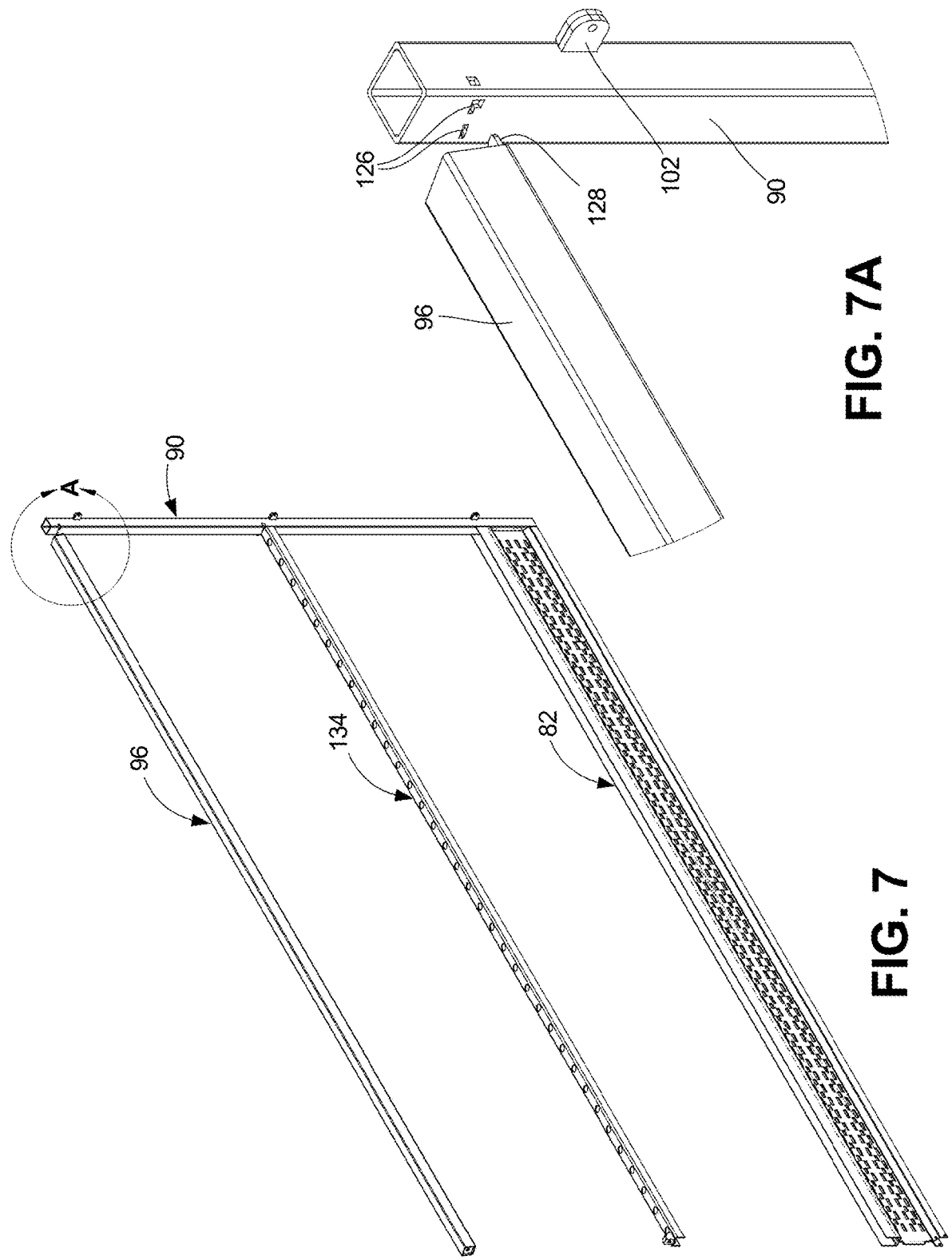
FIG. 7 is a perspective view of the components of FIG. 6 in a connected configuration, and with a top side wall tube positioned for connection to the rear support tube.

FIGS. 6 and 6A show rear support tube 90 and vent element 82 of FIGS. 5 and 5A with a side wall channel 134 positioned for connection thereto. In an exemplary embodiment, an end of side wall channel 134 includes tabs 128 configured for insertion in apertures 126 of rear support tube 90. Similarly, FIGS. 7 and 7A show top side wall tube 96 positioned for connection to rear support tube 90. In an exemplary embodiment, an end of top side wall tube 96 includes tabs 128 configured for insertion in apertures 126 of rear support tube 90.

Figure 9:
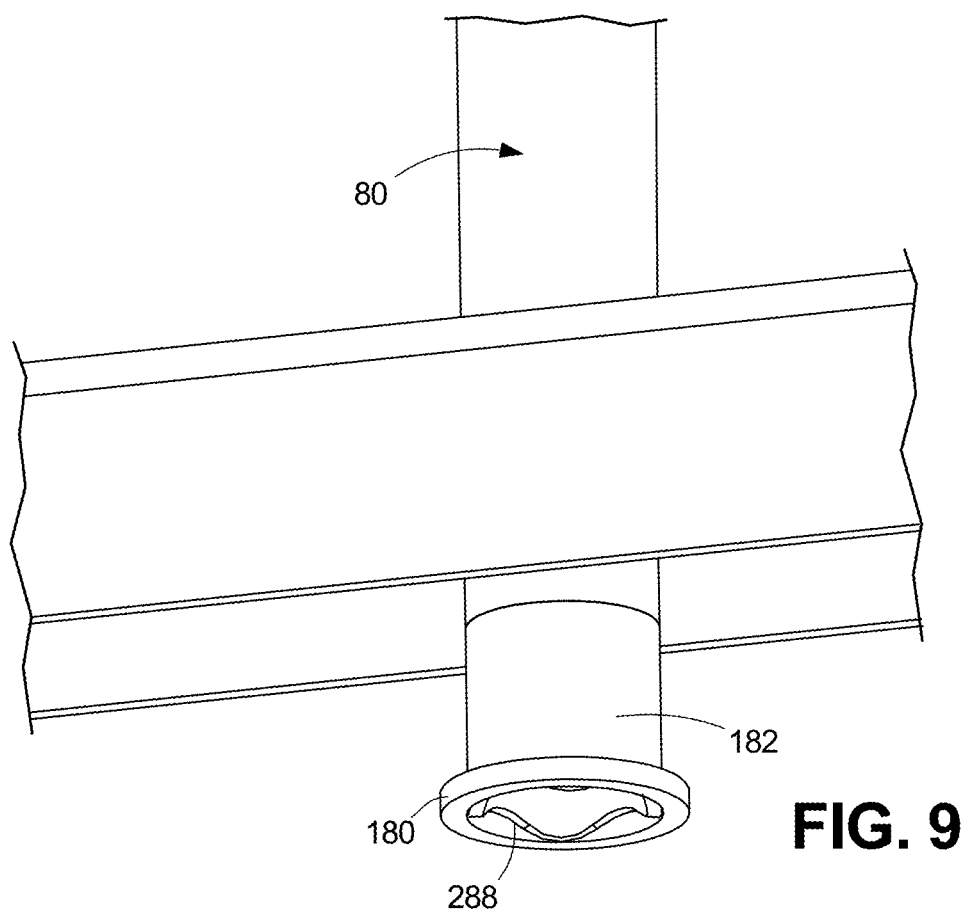
FIG. 9 is a perspective view showing a bottom portion of an exemplary grill tube as the grill tube is inserted into the side wall channel.

As shown in FIG. 8, a front end of side wall channel 134 can be supported by a board 78 inserted between channel 116 of vent element 82 and side wall channel 134. Moreover, a front end of top side wall tube 96 can be supported on a structure such as a scaffold or stand 158. FIGS. 8 and 8A additionally illustrates the insertion of a grill tube 80 upward through an aperture 162 of side wall channel 134. As shown in FIG. 9, in some embodiments, grill tube 80 includes a bottom ring 180 surrounding bottom portion 182, which prevents bottom portion 182 of grill tube 80 from passing entirely through apertures 162 in side wall channel 134. In an exemplary embodiment, bottom surface 288 of grill tube 80 is formed or provided with an undulating configuration to accommodate solder so that grill tube 80 and ring 180 can be welded together on an interior of ring 180. In an exemplary embodiment of the described modular stall system, some grill tubes 80 are provided with ring 180, while other grill tubes 80 do not have ring 180. In practice, it has been found advantageous to use grill tubes 80 having rings 180 especially near a longitudinal center point of the wall, where side channel tube 134 is not attached to rear upright support 90 or front upright support 92 (see FIG. 3). In an exemplary embodiment, among the plurality of grill tubes 80 used in the top section of side wall 72b or 72c, it is suitable to use three centrally placed grill tubes 80 having bottom rings 180 near a central portion of side wall 72b, 72c.

Figure 10:
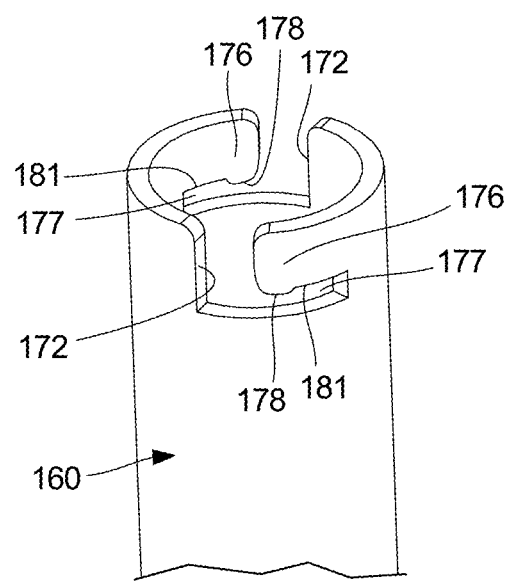
FIG. 10 is a top perspective view of the top portion of the grill tube of FIGS. 8-9.
Figure 11:
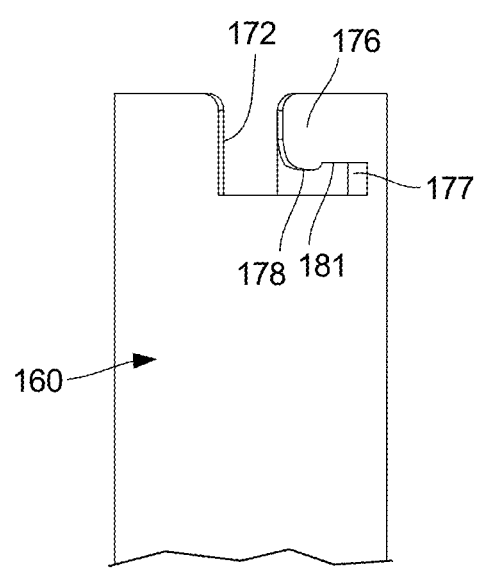
FIG. 11 is a side elevation view of the top portion of the grill tube.
Figure 12:
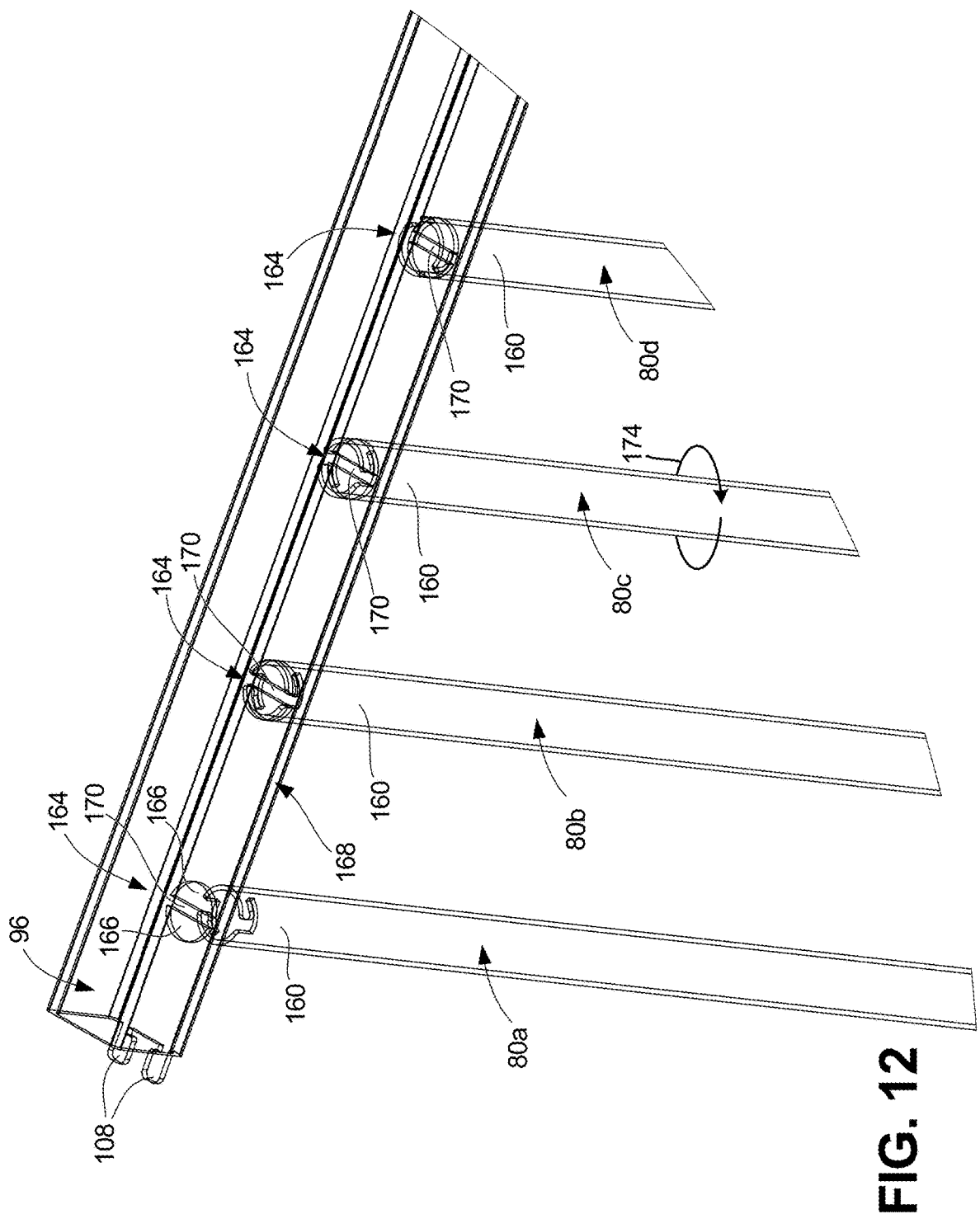
FIG. 12 is a perspective view wherein the top side wall tube is shown as transparent to illustrate the connection of the top portion of the grill tube to apertures in a bottom surface of the top side wall tube.

FIGS. 10-12 illustrate exemplary features for a system of attachment of a top portion 160 of elongated grill tube 80 to a bottom surface 168 of top side wall tube 96. Grill tube 80 has a substantially circular cross-sectional shape and has a longitudinal axis 167 that is oriented to be substantially orthogonal to bottom surface 168. FIG. 10 is a top perspective view of top portion 160 of grill tube 80. FIG. 11 is a side elevation view of top portion 160 of grill tube 80. Each grill tube 80 has an upper portion 160 having features that allow the grill tube 80 to be connected into place on top side wall tube 96 without tools and also allow a user to reverse the attachment operation to remove the grill tube 80 from top side wall tube 96 if desired. Grill tube 80 has first and second opposed end portions: top portion 160 (labeled in FIGS. 8A and 10-12) and bottom portion 182 (labeled in FIGS. 8A and 9).

In exemplary embodiment of top side wall tube 96, a plurality of sets 164 of apertures 166 are provided at discreet, preferably evenly-spaced intervals on a bottom surface 168. In an exemplary embodiment, each aperture 166 is configured as a substantially semicircular hole. However, other configurations for cooperating structures of top side wall tube 96 and top portion 160 of grill tube 80 are also possible. In the illustrated embodiment, the two semicircular apertures 166 of a set 164 are separated by bridge 170. In the illustrated embodiment, two opposed notches 172 are provided in top portion 160 of grill tube 80, the notches defining tabs 176 and slots 177. This structure allows parts of top portion 160 to be inserted into apertures 166 past bridge 170. In the illustrated embodiment, two notches 172 are provided 180 degrees apart on a circular top portion 160. However, it is contemplated that other configurations of top portion 160 may also be suitable, including fewer or more notches, of similar or different shapes, positioned evenly or unevenly, thereon. It is to be understood that changes in the configuration of top portion 160 may also necessitate corresponding changes in aperture sets 164 to provide for mutual attachment.

FIG. 12 is a perspective view wherein top side wall tube 96 is shown as transparent to illustrate the connection of top portion 160 of grill tube 80 to apertures 166 in bottom surface 168. Grill tube 80a is illustrated as positioned for insertion of tabs 176 through apertures 166. Grill tubes 80b and 80c are shown during and after passage of top portion 160, including tabs 176, through apertures 166 and above bottom surface 168 of top side wall tube 96. Grill tube 80c is rotated in direction 174 to lock tabs 176 above bridge 170, resulting in the configuration of grill tube 80d. As shown in FIGS. 10 and 11, in an exemplary embodiment, each tab 176 includes detent 178 which in an exemplary embodiment is configured as a protrusion downward from slot surface 181 of slot 177. As grill tube 80 is turned in direction 174, tab 176 resiliently deforms due to a rotational force exerted by the user, thereby allowing detent 178 to pass over bridge 170. In an exemplary embodiment, a height of the slot 177 below tab 176 has substantially the same dimension as a thickness of the lower wall of top side wall tube 96 at bottom surface 168 for a secure fit. At the end of the connection process, detent 178 is moved past bridge 170 so that slot surface 181 rests upon bridge 170 and detent 178 falls into place in aperture 166. Grill tube 80 is thereby securely attached to top side wall tube 96. For removal of grill tube 80, a sufficient force in a rotational direction opposite connection direction 174 is supplied to again resiliently deform tabs 176 to allow for movement of the detent 178 over and past bridge 170. Thus, while grill tube 80 can be removed from top side wall tube 96 by a user intent on doing so, it is unlikely that these parts will separate inadvertently due to jostling by animals or otherwise during routine use.

Figure 13:
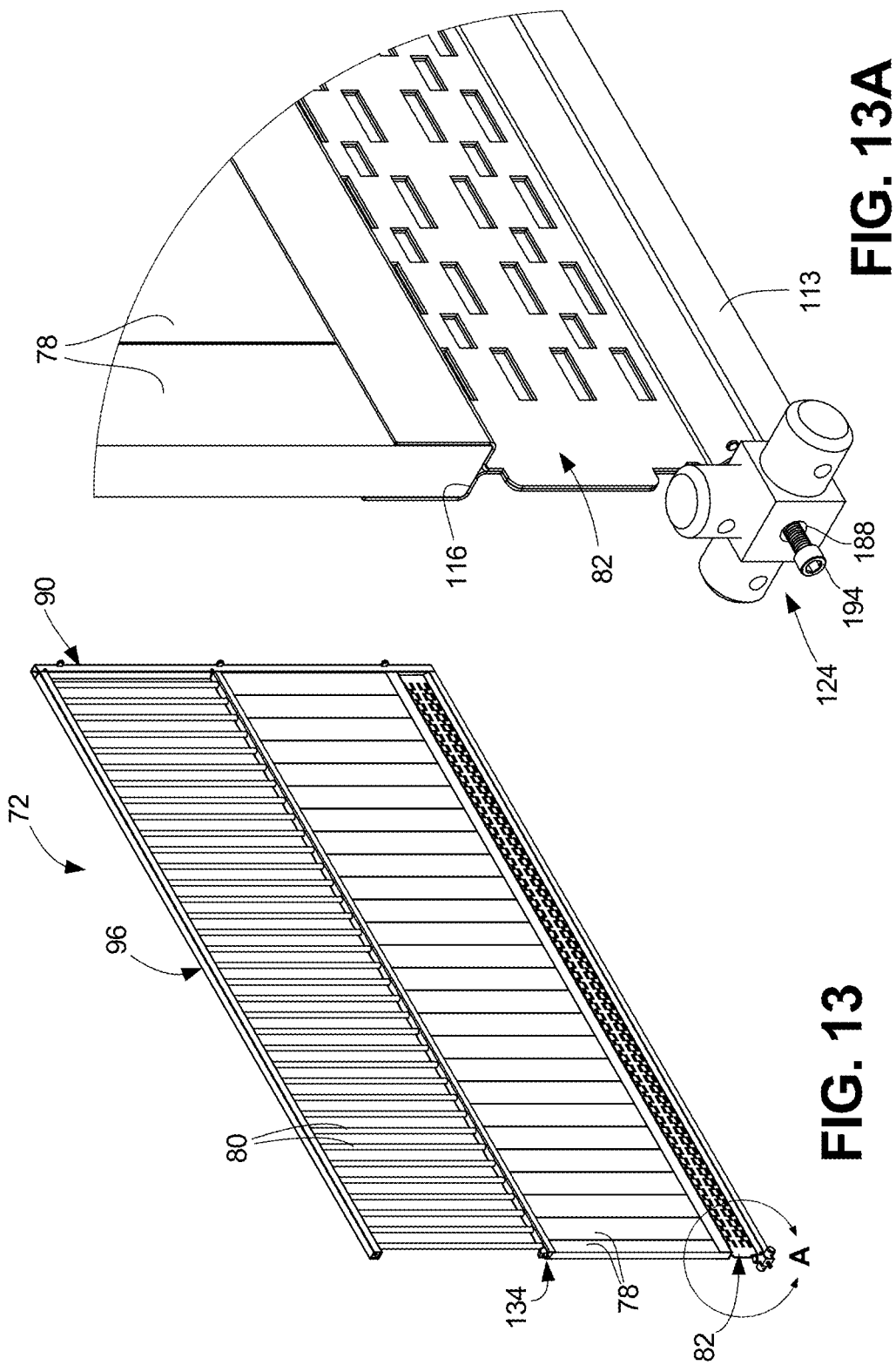
FIG. 13 shows the use of a four-way connector with the vent element.

As shown in FIGS. 8 and 13, after insertion of grill tubes 80, the wall boards 78 that are to be positioned between upper channel 116 of vent element 82 and side wall channel 134 can be inserted under the installed grill tubes 80. In an exemplary embodiment, wall boards 78 are made of wood having tongue-and-groove elements on longitudinal side edges thereof, as is known in the art. Such wall boards 78 made of wood are preferably dried and varnished before installation. However, it is contemplated that wall boards 78 having other materials and construction are also suitable, such as boards made from wood and resin composite formulations, wood and cement composite formulations, and pressed fiberboard, for example. FIG. 13 shows an exemplary side wall 72b after insertion of all of the wall boards 78 and grill tubes 80. If the last wall board 78 protrudes past the front ends of vent element 82 and side wall channel 134, the last wall board 78 can be marked and trimmed to be flush with the front ends of top side wall tube 96, side wall channel 134 and vent element 82.

As shown in FIG. 13A, four-way connector 124 is attached to vent element 82 by fastener 194, which passes through bore 188 of connector 124 and aperture 122 of plate 120 of vent element 82 (visible in FIG. 18A). As shown in FIGS. 14-14B, an exemplary embodiment of four-way connector 124 includes a substantially cube-shaped portion 184 with six faces 284. As in a cube, the six faces 284 include three sets of parallel faces, and any two non-parallel faces meet at a right angle (i.e., the non-parallel faces are orthogonal to each other). Three substantially cylindrical portions 186 extend from three faces 284 of cube portion 184. Cube portion 184 includes bore 188 therethrough having longitudinal axis 296. Each cylindrical portion includes a hole or bore 190 therethrough having longitudinal axis 298. In an exemplary embodiment, all of the axes 296, 298 are substantially parallel to each other. In an exemplary embodiment, some or all of bores 188, 190 are internally threaded to mate with fasteners that are correspondingly externally threaded. In an exemplary embodiment, a portion of bore 188 is wider to accommodate a recessed head of fastener 194.

Figure 15A:
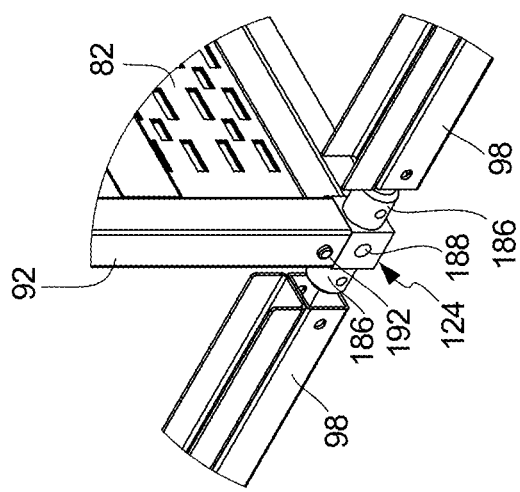
FIG. 15A is an enlarged view of the encircled portion of FIG. 15.
Figure 15:
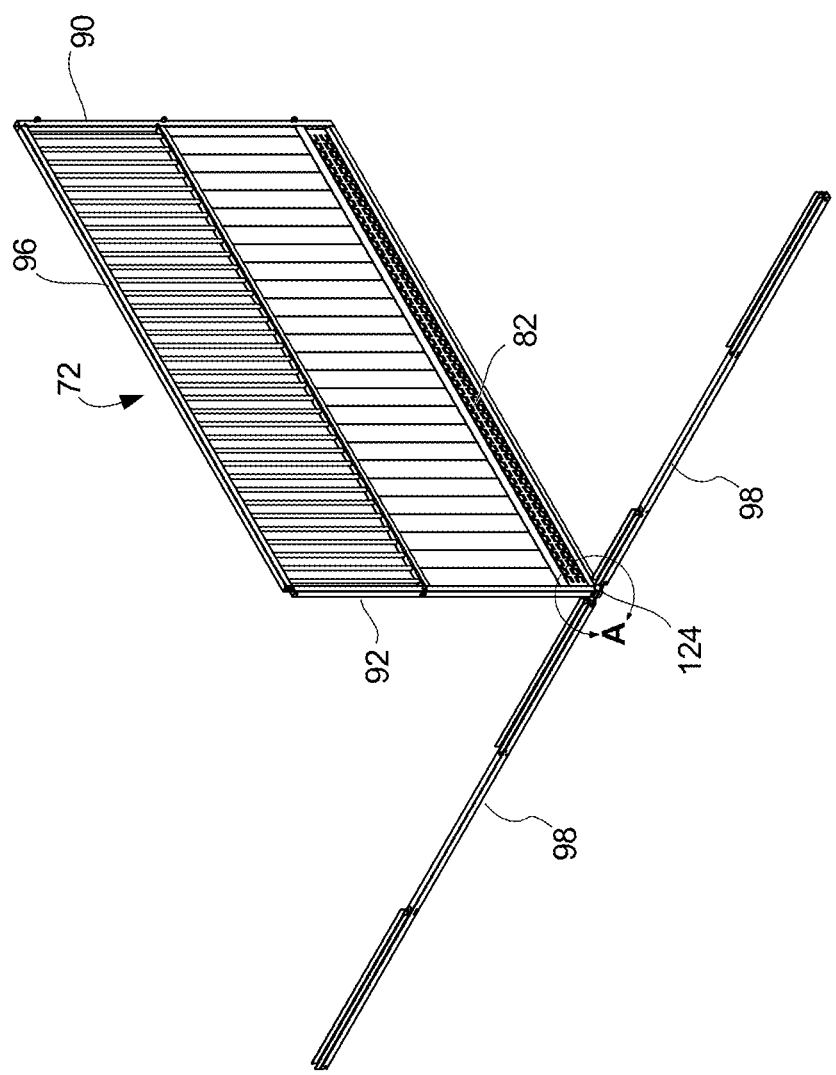
FIG. 15 is a perspective view showing two front floor tubes and front upright support tube connected to the four-way connector of FIG. 13.

FIG. 15 is a perspective view showing a front upright support tube 92 connected to four-way connector 124 and two front floor tubes 98 positioned for attachment to connector 124. FIG. 15A is an enlarged view of the encircled portion of FIG. 15. A top cylindrical portion 186 of four-way connector 124 is inserted into a bottom end of front upright support 92. Four-way connector 124 is secured to the bottom end of front upright support 92 by fastener 192, such as a knurled pin, inserted in an aperture of front upright support 92 and bore 190 of cylindrical portion 186. Another fastener 194 (shown in FIG. 13A) is inserted into bore 188 of cube portion 184 to attach four-way connector 124 to end wall 120 via aperture 122. Simultaneously, the front edge of middle portion 112 of vent element 82 is inserted into a slot on a rear surface of front upright support 92. In this way, vent element 82 and front upright support 92 are connected together. Each of front floor tubes 98 is attached to connector 124 by inserting one of the lateral cylindrical portions 186 of connector 124 into one of front floor tubes 98. Fasteners such as fasteners 192 can be used in a similar manner for front floor tubes 98, as explained above with front upright support 92.

Figure 16:
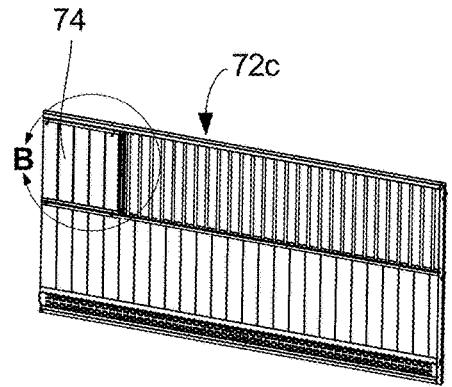
FIG. 16 is a perspective view showing a side wall with a privacy wall feature.
Figure 17A:
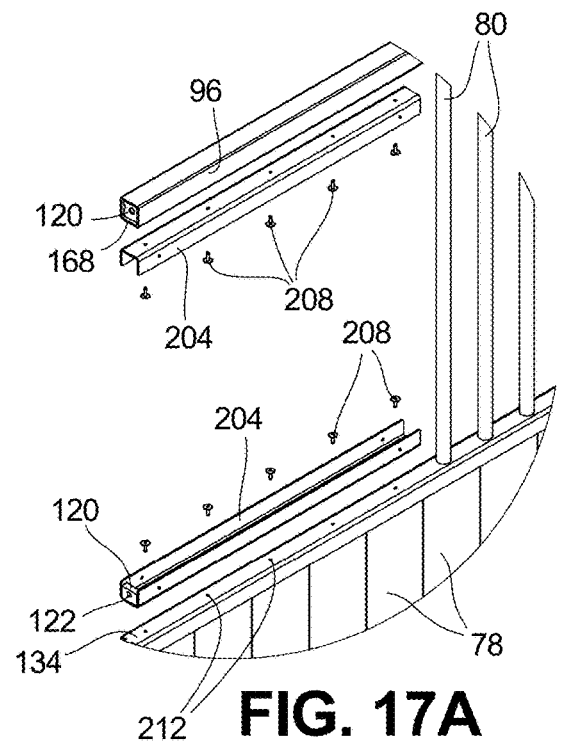
FIG. 17A is an exploded view showing components for installation of the privacy wall feature of FIG. 16.
Figure 17B:
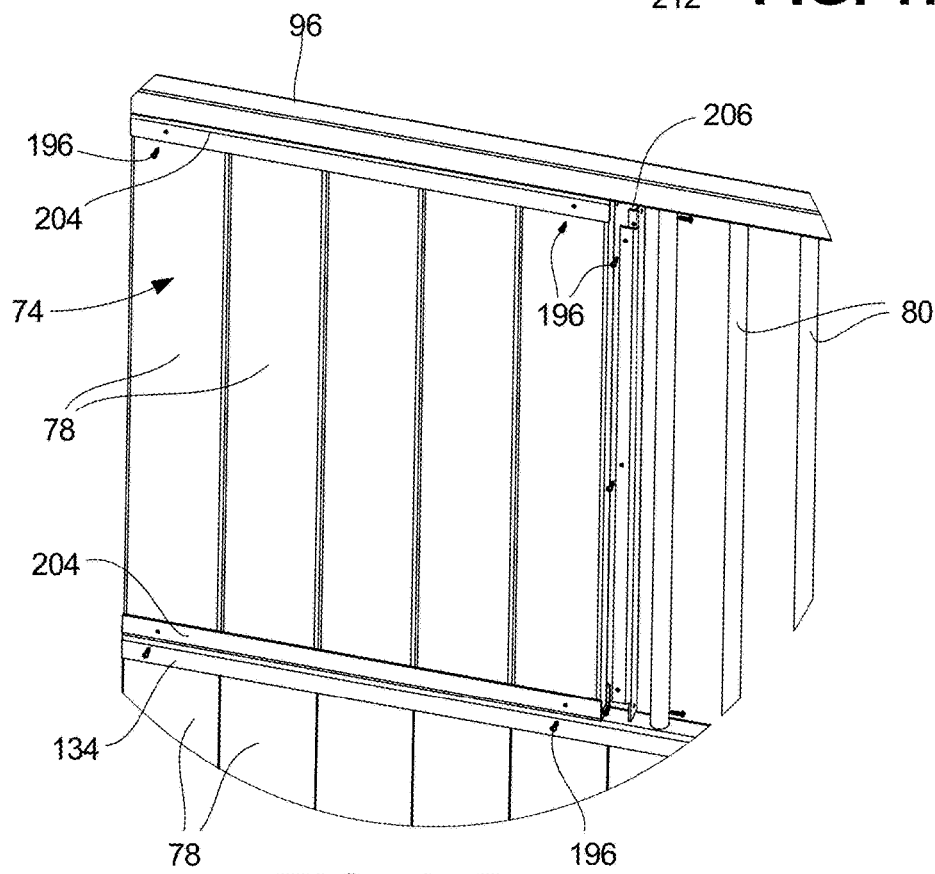
FIG. 17B shows a subsequent step in the privacy wall installation procedure.

FIG. 16 is a perspective view showing a side wall 72c with a privacy wall feature 74. FIG. 17A is an exploded partial view showing components for installation of the privacy wall feature 74. FIG. 17B shows a subsequent step in the privacy wall installation procedure. As shown in FIG. 17A, wall channels 204 at attached to bottom surface 168 top side wall tube 96 and a top surface of side wall channel 134, such as by fasteners 208. In an exemplary embodiment, top side wall tube 96 and side wall channel 134 will be prepared with apertures 212 to accept the fasteners 208, rather than the apertures 66, 162 on the open grill tube portions of the upper section of wall 72c. After wall channels 204 are fastened to top side wall tube 96 and side wall channel 134, a plurality of boards 78 are slid therebetween. Privacy wall upright 206 is attached to and end of the privacy wall feature 74 thereby formed. This attachment is achieved by the insertion, in an exemplary embodiment, of button head socket screw 208 into aperture 210 of privacy wall upright 206 and an aligned bore 142 of boss 136. While particular fasteners are described herein, it is contemplated that other known fasteners or bond agents, whether mechanical or chemical, for example, can also be used. The boards 78, wall channels 204 and privacy wall upright 206 can be secured together, such as with fasteners 196 such as wood screws. As shown in FIG. 18, a solid wall 72a can be formed using full length wall channels 204.

FIG. 18 shows the use of a three-way connector 198 with the vent element 82 and a front floor tube 98. FIG. 18A is an enlarged view of the encircled portion of FIG. 18. Three-way connector 198 is used with the components of the disclosed modular stall system in a similar manner as four-way connector 124. However, in an arrangement of stalls 66 in which another front floor tube 98 will not be connected to the right of three-way connector 198, use of the three-way connector 198 rather than four-way connector 124 eliminates the projection of an unused cylindrical portion 186.

FIG. 19 is a perspective view of an exemplary three-way connector 198. FIG. 19A is a side elevation view of the three-way connector 198. FIG. 19B is a cross-sectional view of the three-way connector 198, taken along line B-B of FIG. 19A. Such a three-way connector 198 is similar to the four-way connector 124 shown in FIG. 14 but eliminates one of the cylindrical portions 186. Accordingly, descriptions pertaining to four-way connector 124 also apply to three-way connector 198.

Figure 20:
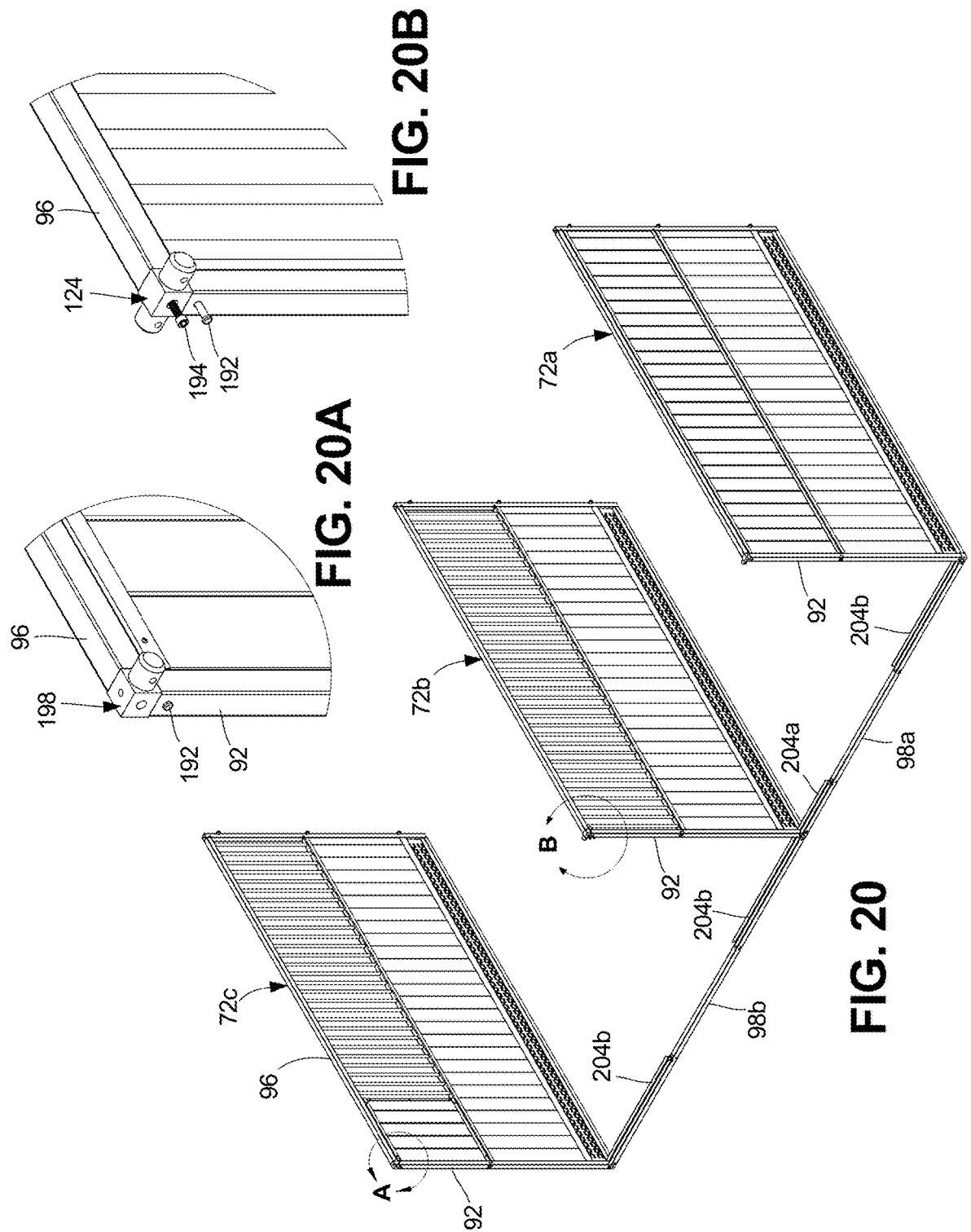
FIG. 20 is a perspective view showing front upright support tubes connected to respective top side wall tubes by three-way and four-way connectors.

FIG. 20 is a perspective view showing front upright support tubes 92 connected to respective top side wall tubes 96 by three-way connector 198 and four-way connector 124. FIG. 20A is an enlarged view of the encircled portion "A" of FIG. 20. FIG. 20B is an enlarged view of the encircled portion "B" of FIG. 20. Front top tubes 100 (shown in FIG. 21) can be attached to the connectors 198, 124 in a similarly manner as the attachment of front floor tubes 98 thereto.

As shown in FIG. 20, front floor tube 98a is shorter than front floor tube 98b. Moreover, wall channels 204a are shorter than wall channels 204b. Additionally, the placement of wall channels 204 of desired size at any location on front floor tubes 98 allows a user to place a door opening toward a left, right, or central location on a stall 66. Similarly, many of the described components of the disclosed modular livestock stall system can be provided in different lengths to facilitate the installation of stalls of customizable sizes and element positions.

Figure 21:
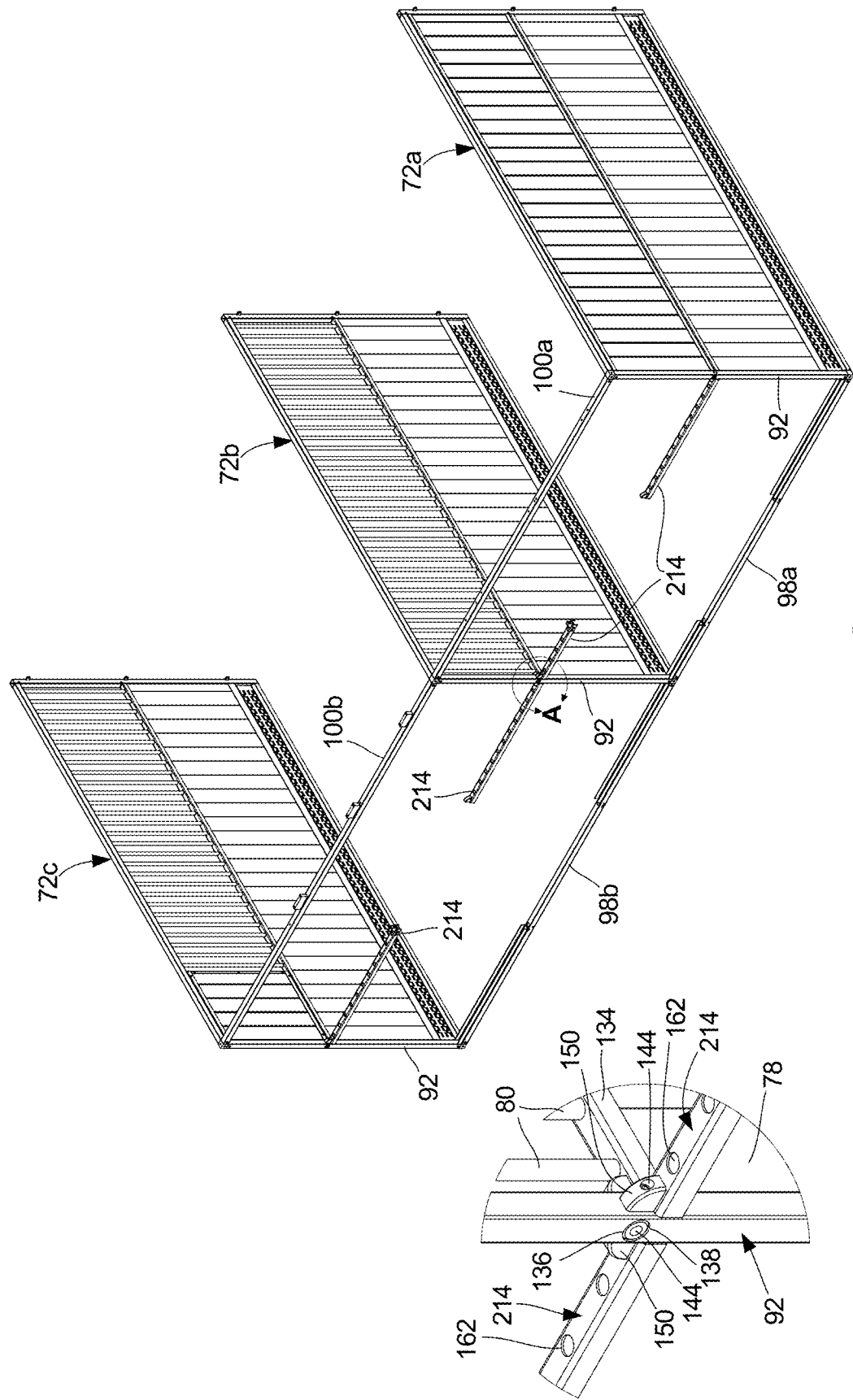
FIG. 21 is a perspective view showing front upright support tubes connected to front channels by boss and bracket assemblies.
Figure 22:
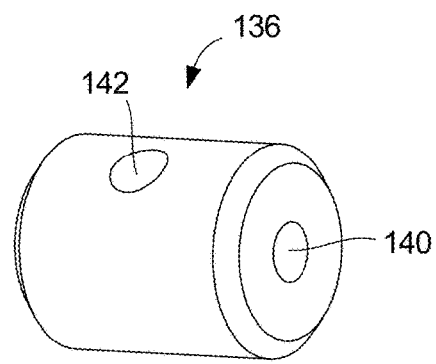
FIG. 22 is a perspective view of an exemplary boss configured for insertion into an exemplary support tube.
Figure 22A:
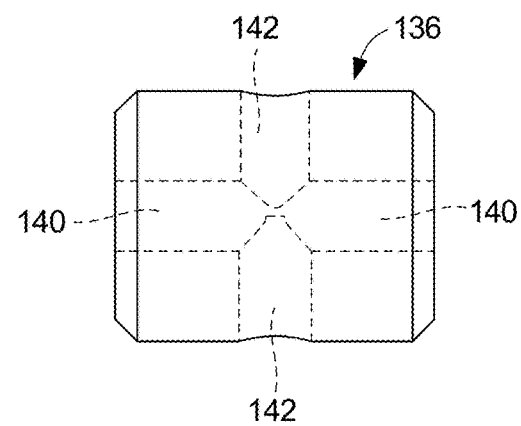
FIG. 22A is a side elevation view of the boss of FIG. 22.
Figure 23:
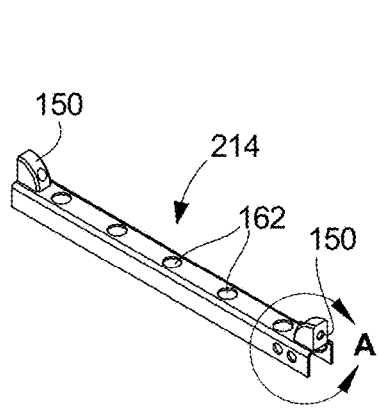
FIG. 23 is a perspective view of an exemplary front channel with bracket.
Figure 23A:
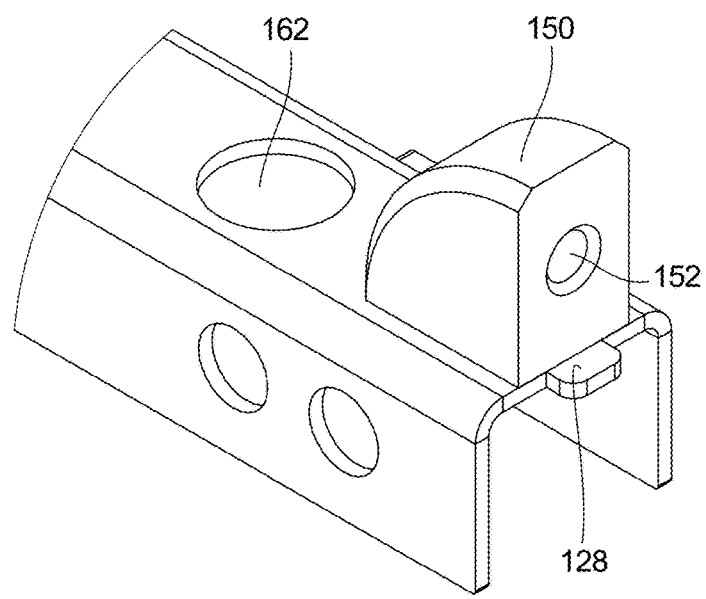
FIG. 23A is an enlarged view of the encircled portion of FIG. 23.

FIG. 21 is a perspective view showing front upright support tubes 92 connected to front channels 214 by boss and bracket assemblies. FIG. 21A is an enlarged view of the encircled portion of FIG. 21. Front upright support 92 includes boss 136 inserted into an aperture 138. In an exemplary embodiment, boss 136 is fixedly attached to front upright support 92, such as by welding, for example. As shown in FIGS. 22 and 22A, an exemplary embodiment of boss 136 includes bores 140 and 142 passing therethrough in substantially orthogonal directions. One or more of bores 140, 142 can be internally threaded to threadably attach to a lag screw or bolt 144, for example. In a completed joint, fastener 144 is countersunk or otherwise contained in boss 136 and front upright support 92 so that it does not protrude therefrom. This advantageously prevents animal contact with the fasteners.

In an exemplary embodiment, front wall channel 214 includes a bracket 150 fixed to a top surface thereof, and having bore 152 for the insertion of bolt 144. In an exemplary method for attaching front wall channel 214 to front upright support 92, bolt 144 is inserted into bore 152 of bracket 150 and threadably engaged through a corresponding hole in front upright support 92 with bore 142 of boss 136. At the same time, tab 128 is received in a corresponding slot of front upright support 92. The two points of connection of front wall channel 214 to front upright support 92 at tab 128 and bolt 144 securely retain the front wall channel 214 and front upright support 92 in the desired positions by preventing relative rotational and other displacement between front wall channel 214 and front upright support 92. In many respects, front wall channel 214 is similar to side wall channel 134 except in length. As shown in FIG. 24, front wall portions 68a, 68b are formed thereafter in a manner similar to that described with respect to side walls 72.

FIG. 24 is a front perspective view showing installation of a door jamb 218 to a front wall portion 68b. FIG. 24A is an enlarged view of the encircled portion of FIG. 24. A bottom portion of door jamb 218 includes plug 220 with a semi-hemispherical bottom portion 222. This structure allows a user to tilt door jamb 218 into position, such as shown in FIG. 24, wherein the downwardly projecting bottom portion 222 retains door jamb 218 within aperture 200 of front floor tube 98, yet allows extensive freedom of movement for alignment purposes. Door jamb 218 has a boss 136 like that of front upright support 92 to allow door jamb 218 to be secured to front wall channel 214 at a joint including bracket 150, similar to the joint described with reference to FIGS. 21-23A. FIG. 24 shows a second door jamb 218 similarly installed on the other side portion of front wall 68.

FIG. 25 is a perspective view showing installation of a door latch 88 to front wall channel 214. FIG. 25A is an enlarged view of the encircled portion of FIG. 25. In an exemplary embodiment, latch 88 is attached to front channel 214 via torque screws 216.

Figure 26:
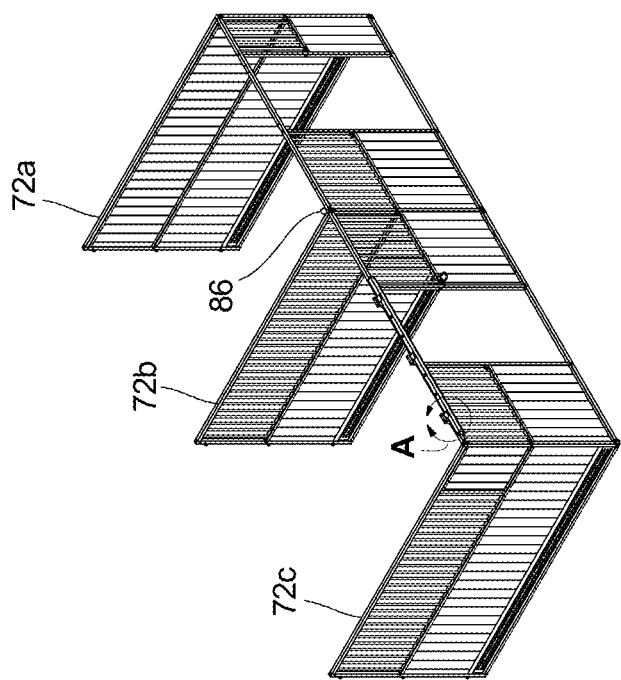
FIG. 26 is a perspective view showing an assembly of the door track and the front top tube.
Figure 26A:
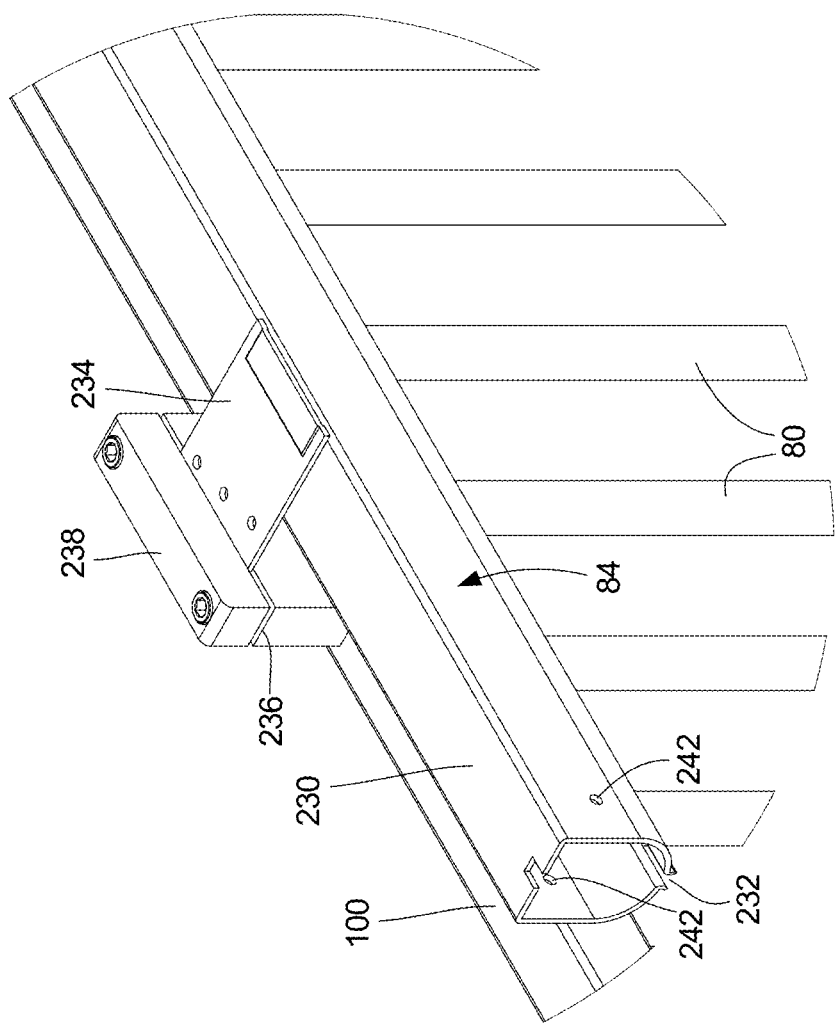
FIG. 26A is an enlarged view of the encircled portion of FIG. 26.

FIG. 26 is a perspective view showing an assembly of the door track 84 and the front top tube 100. FIG. 26A is an enlarged view of the encircled portion of FIG. 26. In an exemplary embodiment, door track 84 is a substantially tubular member 230 with a longitudinal slot 232 in a bottom portion thereof. Flanges 234 are attached to or otherwise provided on an upper or other portion of tubular member 230. Flanges 234 are configured for insertion into receiving slots 236 of clamp block 238 affixed to front top tube 100.

Figure 27:
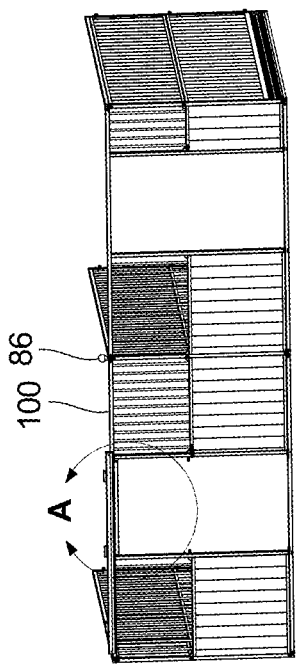
FIG. 27 shows insertion of a trolley of a door top frame into the door track.
Figure 27B:
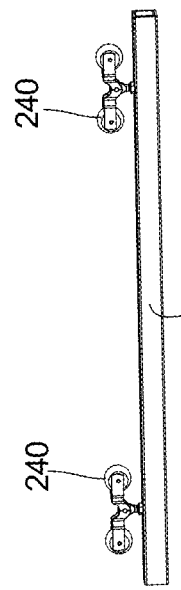
FIG. 27B shows the trolley removed from the door track.
Figure 27A:
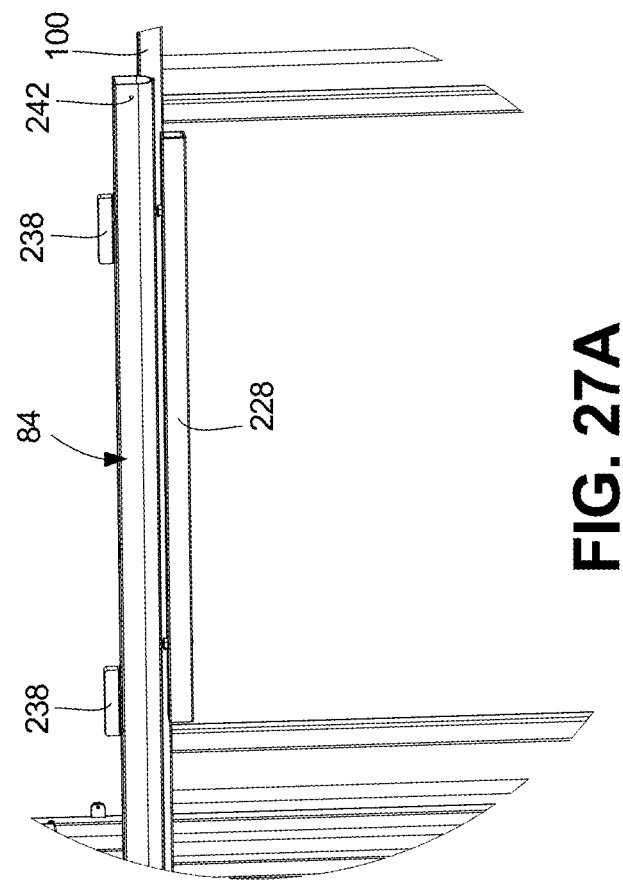
FIG. 27A is an enlarged view of the encircled portion of FIG. 27.
Figure 40:
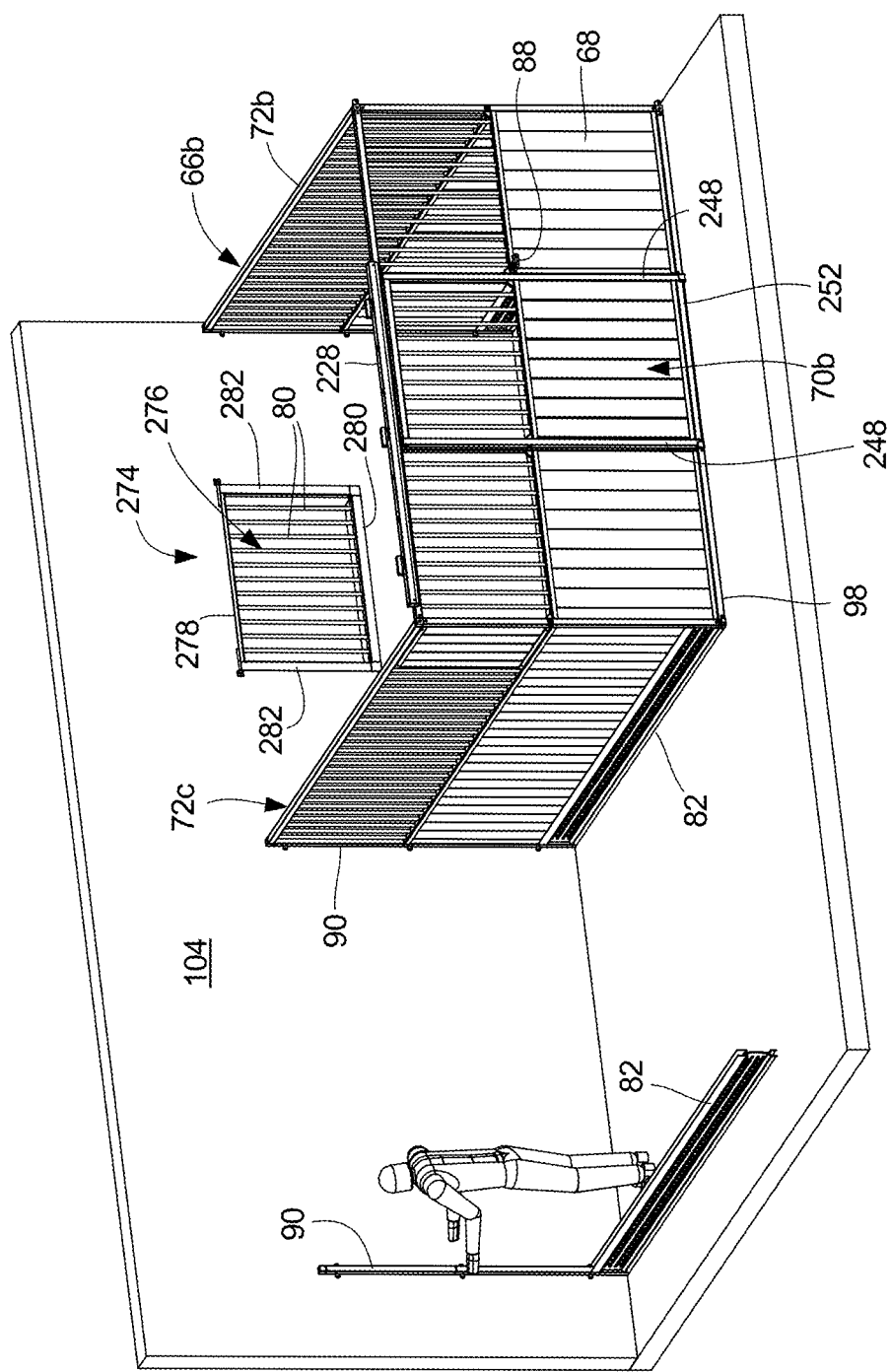
FIG. 40 is a perspective view showing one completed livestock stall and the first steps for construction of an adjacent second stall. Additionally.

FIG. 27 shows insertion of trollies 240 of a door top frame 228 into the door track 84. FIG. 27A is an enlarged view of the encircled portion of FIG. 27. FIG. 27B shows the trollies 240 removed from the door track 84. As shown in FIG. 27B, trollies 240 are attached to door top frame 228, such as by the use of nuts, washers and bushings. Accordingly, top door frame 228, and thus door 70b, are suspended from trollies 240, which, as shown in FIG. 27A, are received within tubular member 230 of door track 84. Referring to FIG. 26A, in an exemplary embodiment, a bolt can be installed in cross holes 242 at both ends of door track 84 to retain trollies 240 within tubular member 230 of door track 84. Referring to FIGS. 3 and 40, it can be seen that sliding door 70b may be formed in a manner similar to that described with respect to walls 72, 68, using similar components. In a completed stall 66, grill tubes 80 and boards 78 have been installed on door 70 in a similar manner as described with reference to the side walls 72 and front wall 63. As shown in FIG. 3, in an exemplary embodiment, a door side frame 248 includes lock 250 for cooperation with latch 88. FIG. 3 shows that door side frames 248 are attached to door bottom frame 252. The attachment of these frame members to each other may be accomplished using similar components as described below with reference to gate door 70a.

Figure 28A:
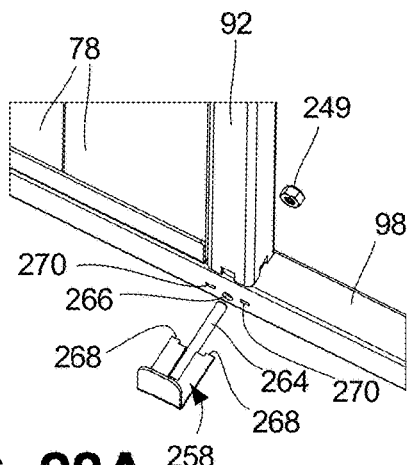
FIG. 28A is a partial perspective view showing installation of a door guide into the front floor tube.
Figure 28B:
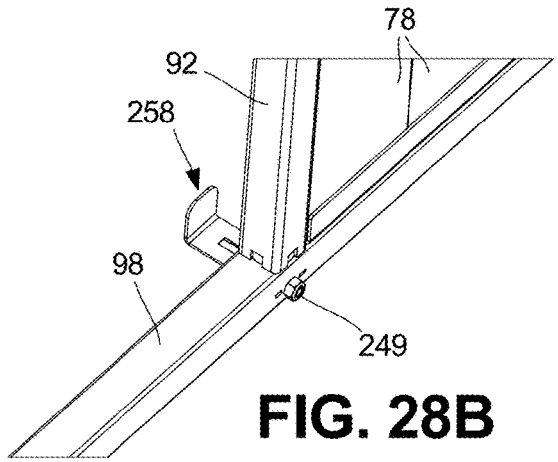
FIG. 28B is a partial perspective view showing the installed door guide from the inside of the stall.

Please refer to FIG. 3 for illustrations of door guide 258, door stop 260 and door bumper 262. FIG. 28A shows alignment of door guide 258 with front floor tube 98 for attachment thereto. In an exemplary embodiment, door guide 258 includes rod 264 for insertion into aperture 266 of floor front tube 98 and tabs 268 for insertion into apertures 270 of front floor tube 98. A nut 249 secures the end of rod 264. FIG. 28B shows the assembled door guide 258 from an interior of the stall 66.

Figure 29A:
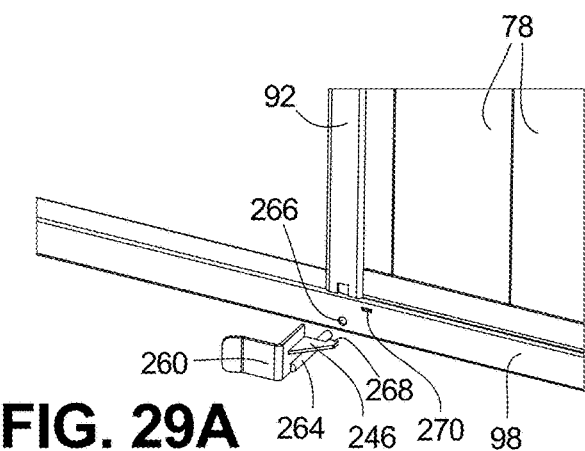
FIG. 29A is a partial perspective view showing installation of a door stop on the front floor tube.
Figure 29B:
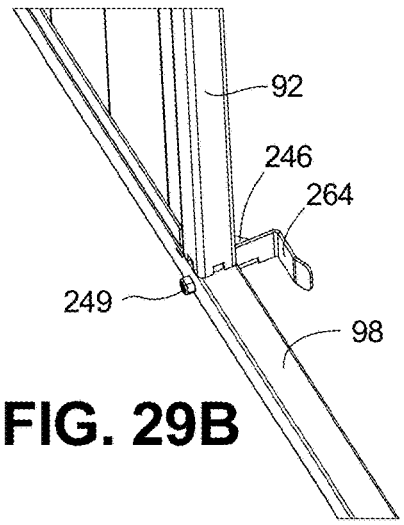
FIG. 29B is a partial perspective view showing the installed door stop from the inside of the stall.

FIG. 29A is a partial perspective view showing installation of a door stop 260 on the front floor tube 98. FIG. 29B is a partial perspective view showing the installed door stop 260 from the inside of the stall 66. Tab 264 is provided on a structural rib plate 246. Door stop 260 is attached to front floor tube 98 in a manner similar to the attachment of door guide 258 to front floor tube 98.

Figure 30A:
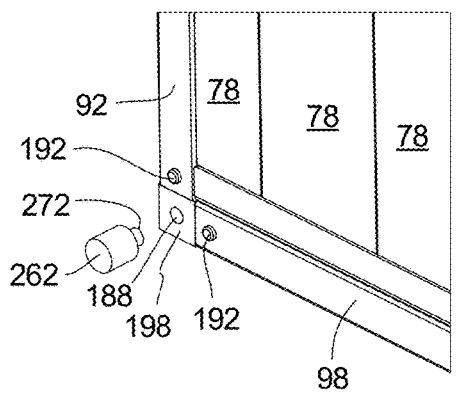
FIG. 30A is a partial perspective view of a door bumper aligned for insertion into a three-way connector attached to a front floor tube and front upright support.
Figure 30B:
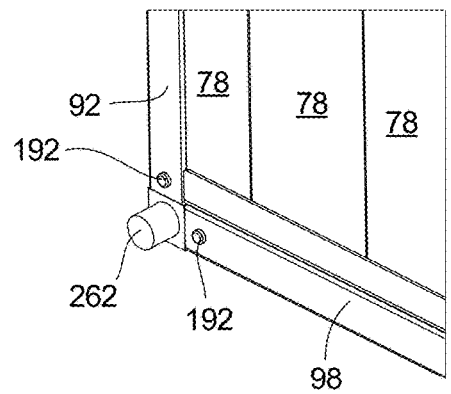
FIG. 30B is a partial perspective view showing the installed door bumper.

FIG. 30A is a partial perspective view of a door bumper 262 aligned for insertion into a three-way connector 198 attached to a front floor tube 98 and front upright support 92. FIG. 30B is a partial perspective view showing the installed door bumper 262. Door stop 262 is attached to bore 188 of either four-way connector 124, three-way connector 198, or an analogous connector. In an exemplary embodiment, shaft 272 of door bumper 262 is threaded into bore 188.

Figure 31:
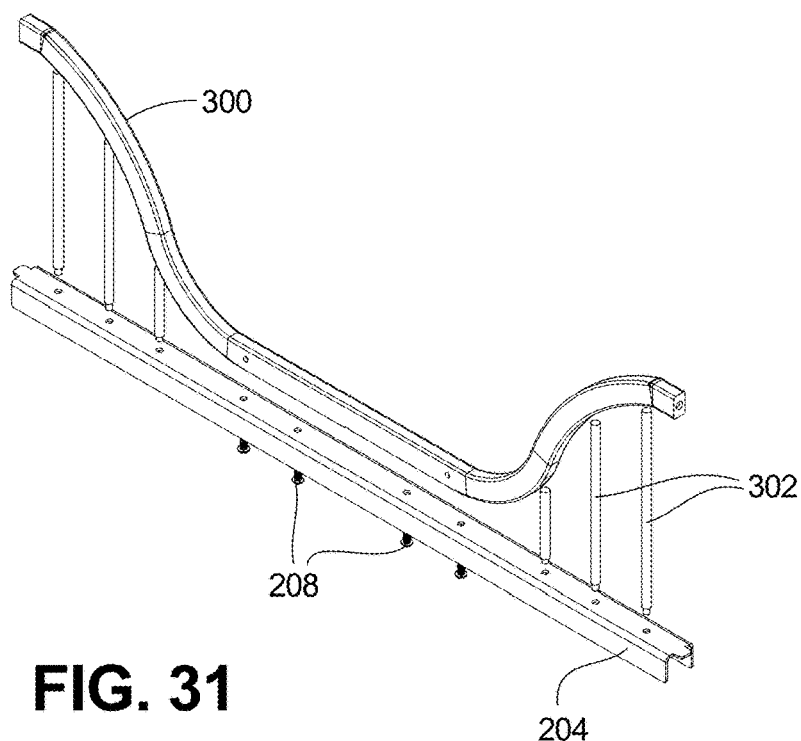
FIG. 31 is an exploded perspective view of a gate top element.
Figure 32:
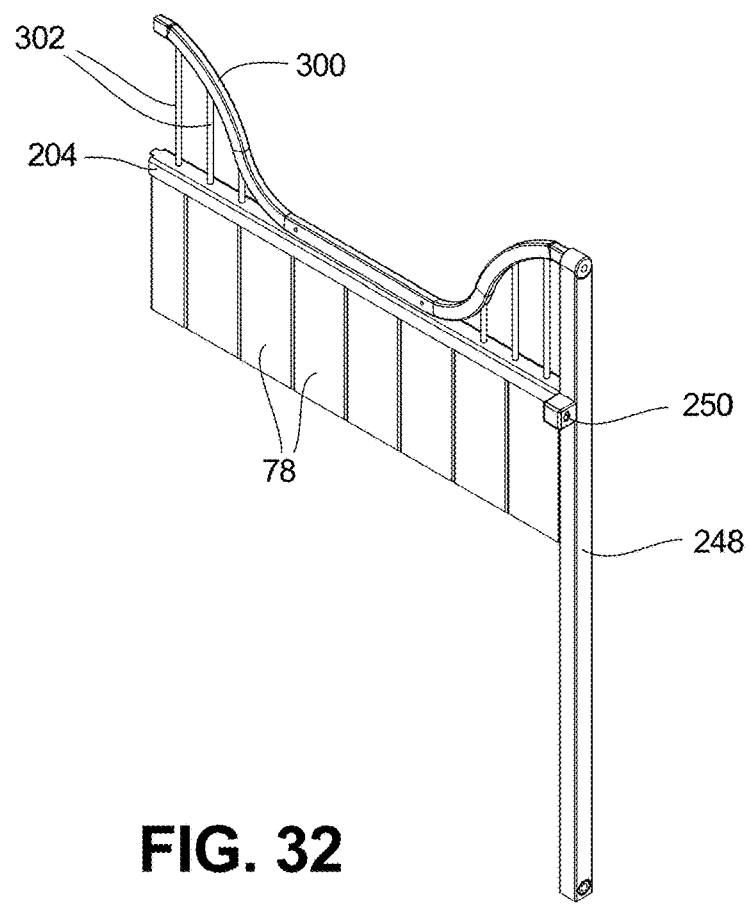
FIG. 32 shows boards connected to the gate top element.
Figure 33:
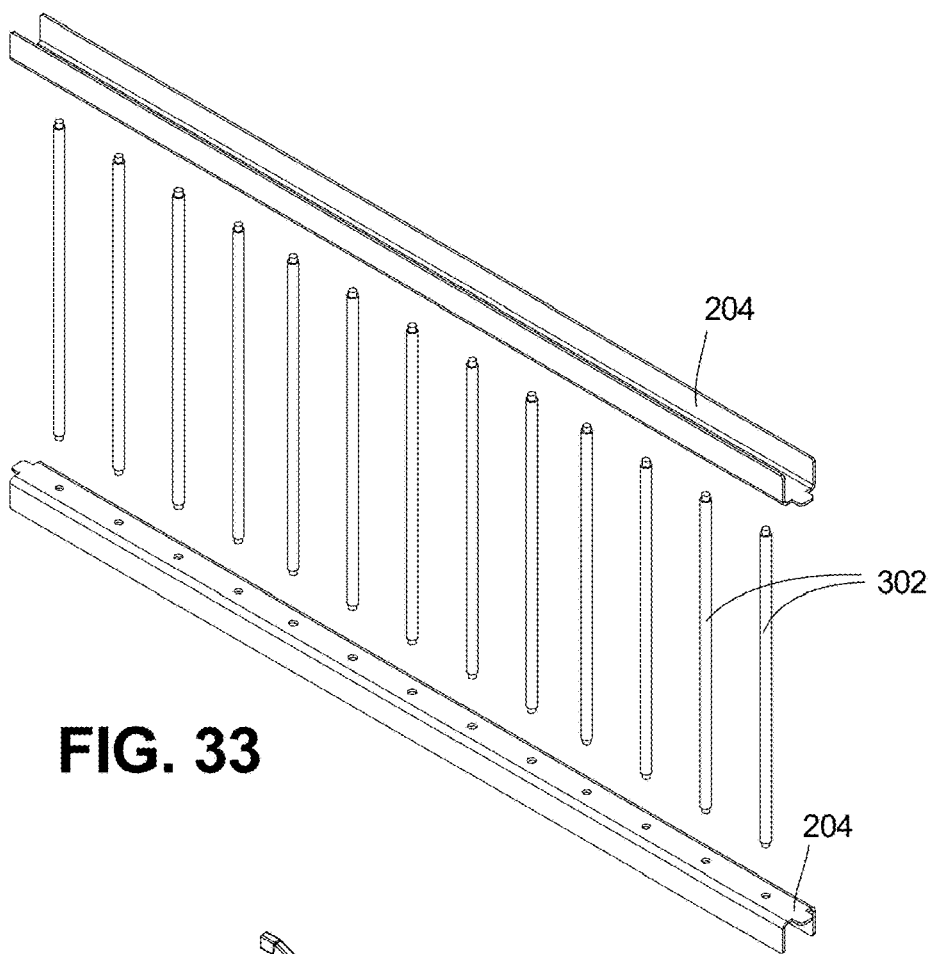
FIG. 33 is an exploded perspective view of a gate middle element.
Figure 34:
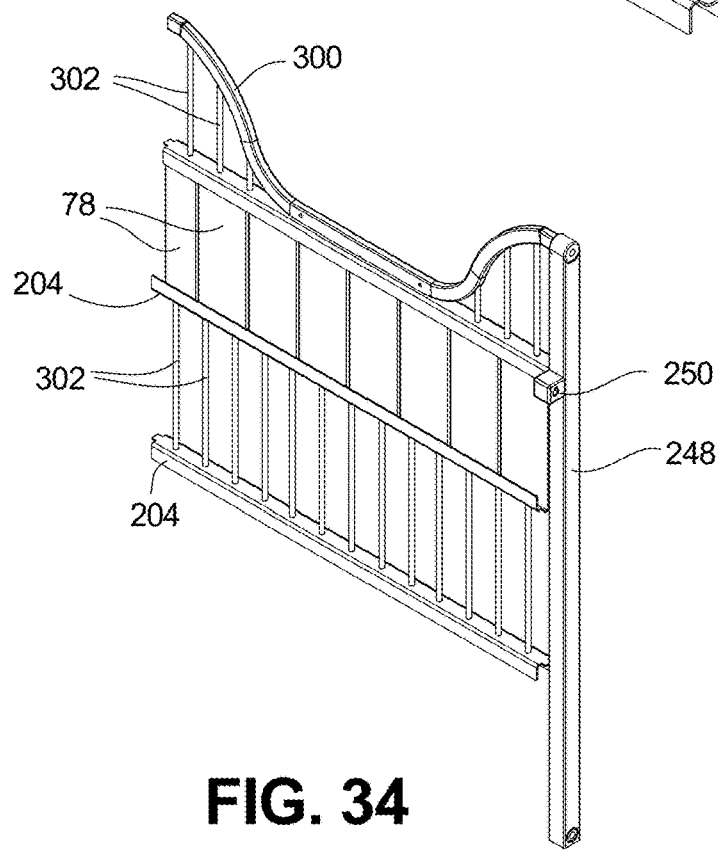
FIG. 34 shows the gate middle element connected to the boards of FIG. 32.
Figure 35A:
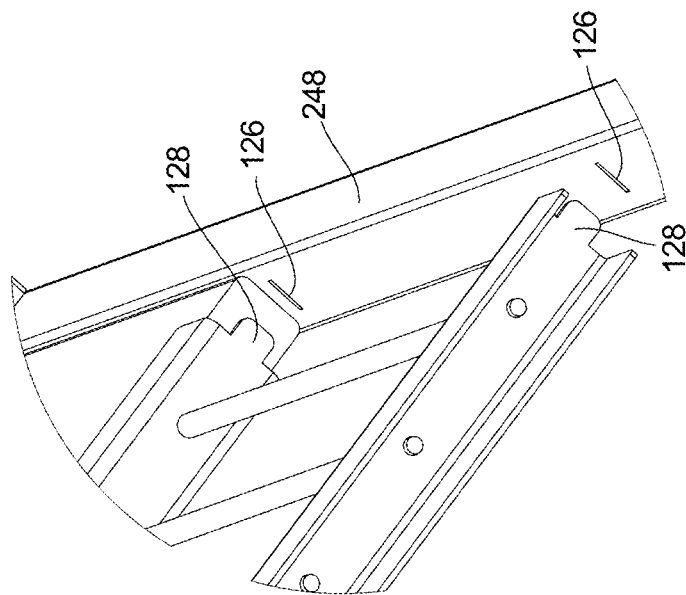
FIG. 35A is an enlarged view of the encircled portion of FIG. 35.
Figure 35:
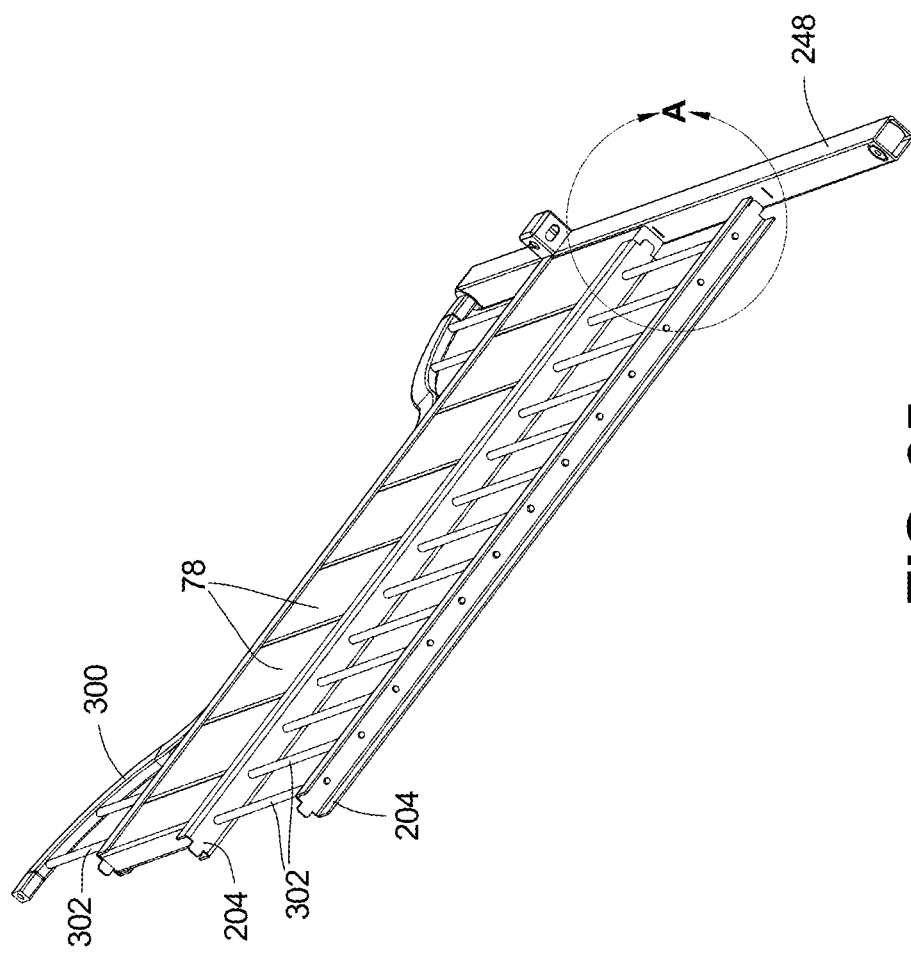
FIG. 35 shows the gate middle element positioned for connection to a gate side frame tube.
Figure 36:
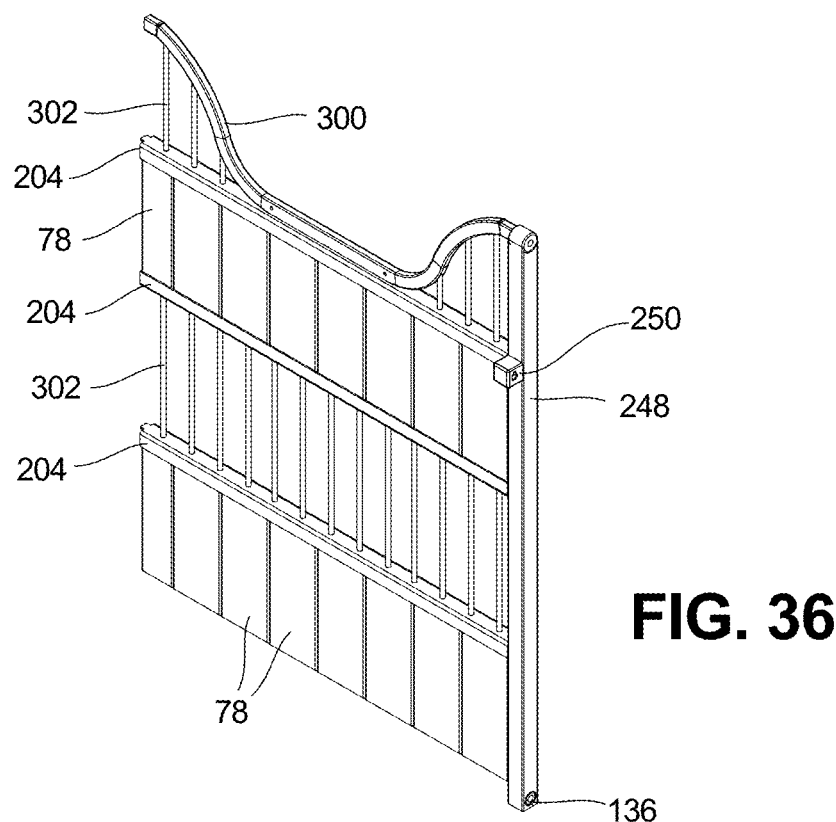
FIG. 36 shows additional boards connected to the gate middle element.
Figure 37:
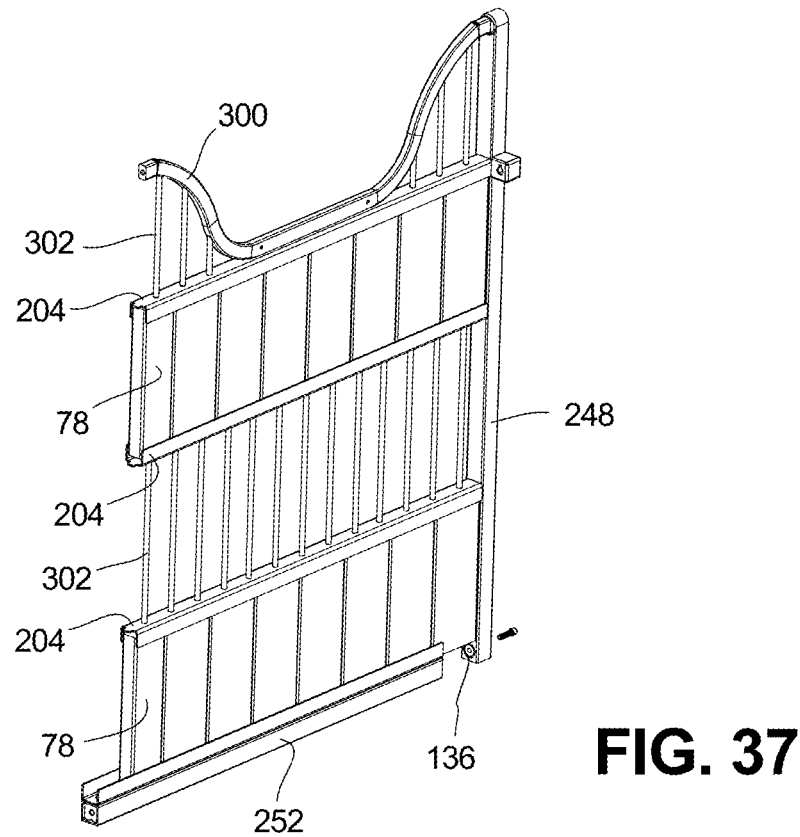
FIG. 37 shows a gate bottom frame tube positioned for connection to the additional boards and the gate side frame tube.

FIG. 31 is an exploded perspective view of a gate top assembly including top frame 300, spindles 302, wall channel 204 and fasteners 208. While an arched configuration of top frame 300 is illustrated, other configurations are also possible. FIG. 32 shows boards 78 and door side frame 248 connected to the gate top assembly. FIG. 33 is an exploded perspective view of a gate middle assembly including wall channels 204 and spindles 302. FIG. 34 shows the gate middle element connected to the boards 78 of FIG. 32. FIG. 35 is a bottom perspective view showing the wall channels 204 positioned for connection to a gate side frame 248. FIG. 35A is an enlarged view of the encircled portion of FIG. 35, showing the alignment of tabs 128 for insertion into apertures or slots 126. FIG. 36 shows additional boards 78 connected to wall channel 204. FIG. 37 shows a gate or door bottom frame 252 positioned for connection to the additional boards 78 and the gate or door side frame 248. FIG. 38 shows a second gate side frame 248 positioned for connection to complete the gate 70a. FIG. 39 is a perspective view of a door jamb 218a configured for use with the gate of FIGS. 31-38. FIG. 39A is an enlarged view of the encircled portion "A" of FIG. 39. FIG. 39B is an enlarged view of the encircled portion "B" of FIG. 39. Door jamb 218a and door side frame 248a feature cooperating hinge elements 304.

FIG. 40 is a perspective view showing one completed livestock stall 66b and the first steps for construction of an adjacent second stall 66. Additionally, FIG. 40 shows a grilled window cover 274 that can be custom fit to an existing window opening. FIG. 40 shows installation steps for an adjacent stall, including attaching rear upright support 90 to wall 140 and vent element 82 to rear support 90. A distance between adjacent rear supports 90 is the same as a length of front floor tube 98. Proceeding as described above, any number and arrangement of stalls 66 can be constructed.

Moreover, while particular configurations of the modular components is illustrated, it is contemplated that other configurations are possible. For example, door 70b is designed in the illustrated stall 66b to slide open to the left, when viewed from the front of the stall from the outside. However, the placement of latch 88, lock 250, door guide 258, door stop 260 and door bumper 262 can be changed to allow door 70 to slide open to the right (some components omitted in FIG. 40 but shown in FIG. 3).

FIG. 40 shows an exemplary grilled window cover 274 that can be constructed to custom fit into an existing window opening 276. Components of window cover 274 include a top tube 278 that is similar to top side wall tube 96; window channel 280 that is similar to side wall channel 134; and side frames 282 that are similar to door side frames 248. In an exemplary embodiment, grill tubes 80 are inserted up through apertures (like apertures 162) of window channel 280 and secured to aperture sets (like aperture sets 164) in top tube 278 before window cover 274 is secured in place in window opening 276.

Figure 41A:
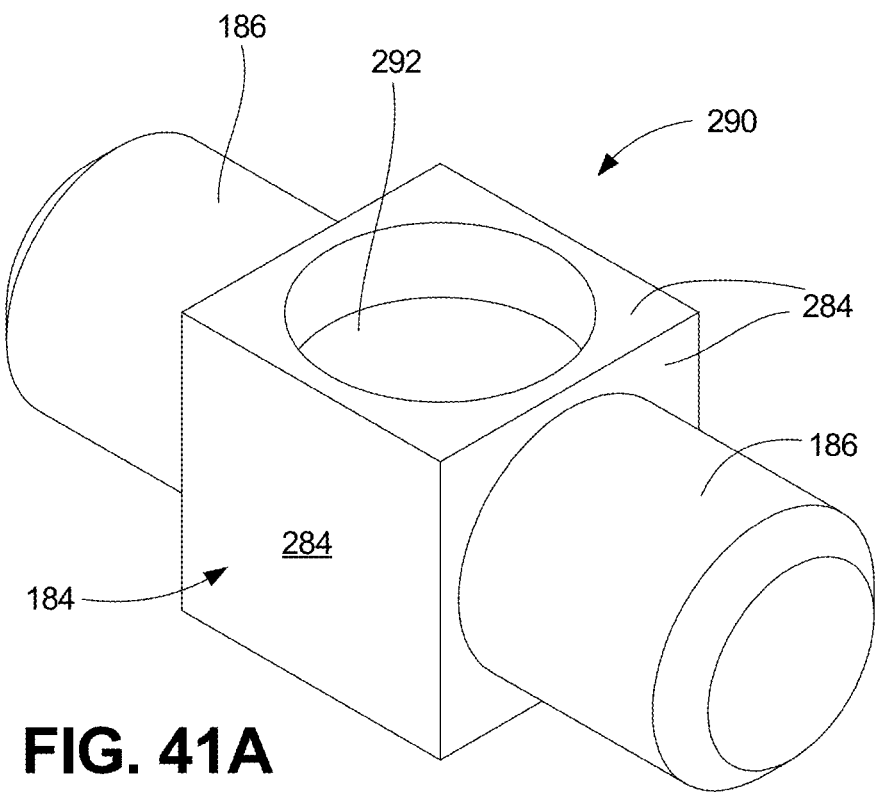
FIG. 41A is a top perspective view of a connector element that is formed in an intermediate step for manufacture of the four-way connector of FIG. 18.
Figure 41B:
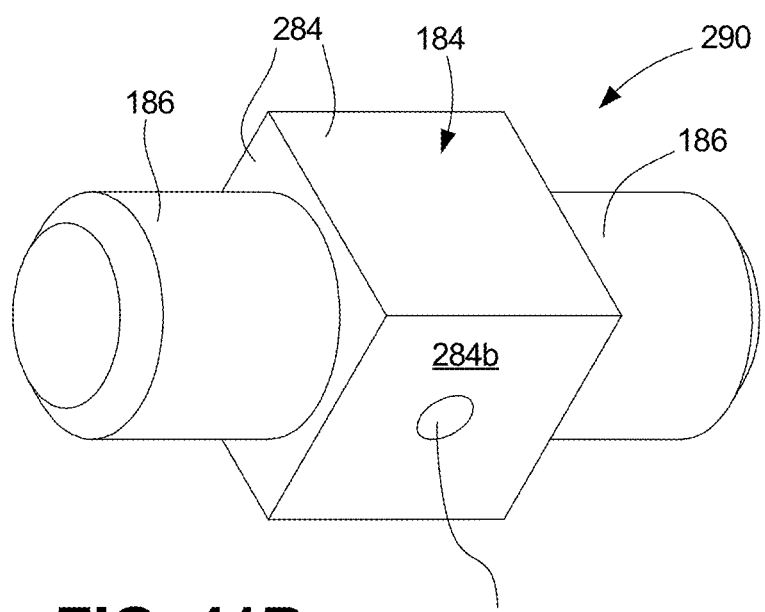
FIG. 41B is a bottom perspective view of the connector element of FIG. 41A.

FIG. 41A is a top perspective view of a connector element 290 that is formed in an intermediate step for manufacture of the four-way connector 124. FIG. 41B is a bottom perspective view of connector element 290. In an exemplary embodiment, connector element 290 is formed from a square bar, such as a bar made of steel for example, having an indeterminate length and a side dimension of about 1.75 inch. Using milling equipment such as a laser cutter or lathe, the square bar is cut off to the illustrated length. In an example, the square bar is turned on a CNC (Computer Numerical Control) lathe and shaped to produce cube portion 184 having two cylindrical portions 186 on opposite faces 284 thereof. In an exemplary embodiment, each cylindrical portion 186 has a diameter of about 1.50 inch. Aperture 292 is bored into cube portion 184 for the acceptance of a third cylindrical portion 186, which is brazed into place (as shown in FIGS. 14-14B). Thereafter, bores 188, 190 and 286 are machined into connector 124. It is to be understood that a similar process can be used to form three-way connector 198 of FIGS. 19-19B. In that case, the square bar would be turned on a lathe to produce a connector element with cube portion 184 and only one extending cylindrical portion 186.

Connector element 290 can also be used as a two-way connector where appropriate. Such a two-way connector is similar in many respects to the four-way connector 124 shown in FIG. 14 and the three-way connector 198 shown in FIG. 19. Accordingly, descriptions pertaining to those connectors also apply to such a two-way connector.

In some embodiments, a bottom face 284b of cube portion 184 includes bore or aperture 286, which in an exemplary embodiment is a tapped hole configured to accept a shaft of an element, such as finial 86 shown in FIGS. 26 and 27. While directional terms such as "bottom" are used for ease of reference with respect to the drawing figures, it is to be understood that the structures may be oriented otherwise. For example, it is evident in FIGS. 26 and 27 that finial 86 is attached to an aperture 286 located on a face of a connector that is oriented to face upward.

While the two cylindrical portions 186 of the illustrated three-way connector 196 are shown as being oriented substantially orthogonally with respect to each other, it is contemplated that other configurations for a connector based on the teachings of the illustrated three-way connector 198 and four-way connector 124 can be devised by having different numbers of cylindrical portions 186 at different orientations relative to cube portion 184, as desired for a particular connection joint. Moreover, while projection portions 186 are illustrated as being cylindrical, they may have other shapes and configurations that allow for insertion into ends of the tubular frame members.

Thus, while particular embodiments of connectors are illustrated, it is to be understood that many variations may be made in the number of projecting portions 186, the shapes of the projecting portions (which need not be cylindrical), the placement and orientation of bores in the connectors, the orientations of the projecting portions relative to the cube portion, and the lengths of the projecting portions, for example. Moreover, the connectors may be used for the attachment of not only the described tubes and elements, but if any of a variety of other parts and accessories, including the described finials. Moreover, while the disclosure describes modular livestock stalls, the teachings herein can also be applied to other modular enclosures, such as cubicles and pens, for example.

Although the subject of this disclosure has been described with reference to several embodiments, workers skilled in the art will recognize that changes may be made in form and detail without departing from the scope of the disclosure. In addition, any feature disclosed with respect to one embodiment may be incorporated in another embodiment, and vice-versa.

What is claimed is:

1. A barrier wall system including:
    a first elongated rail comprising a lower wall defining a first elongated surface;
    a plurality of elongated tubes, each having a longitudinal axis that is substantially orthogonal to the first elongated surface, each tube having first and second opposed ends, and including, at the first end, opposed first and second longitudinally extending notches connected to respective circumferentially-extending first and second slots, each notch and slot set defining a corresponding first or second tab, wherein the first elongated surface includes at least one pair of first and second apertures extending therethrough, and wherein each pair of apertures corresponds to a respective tube and is configured to allow the first and second tabs to pass therethrough and be rotated to a position in which the first elongated surface engages the first and second slots;
    a second elongated rail comprising an upper wall and a pair of opposing sidewalls forming a first elongated channel therebetween, the upper wall including at least one third aperture extending therethrough, each configured to allow passage of the first end of a respective tube and retain the second end of the tube within the first elongated channel; and at least one wall board, each having opposed top and bottom ends, wherein the first elongated channel is configured to accept the top end of the wall board; and an elongated vent element including a perforated panel and a second elongated channel at an upper portion thereof configured to accept the bottom end of the wall board.

2. The system of claim 1 wherein:

each tube has a substantially circular cross sectional shape; and each of the first and second apertures has a substantially semicircular shape.

3. The system of claim 1 wherein the lower wall has a thickness dimension, and wherein each of the first and second slots of each tube has a height substantially equal to the thickness dimension.

4. The system of claim 1 wherein at least one of the plurality of elongated tubes further includes a ring surrounding the second end of the tube.

5. The system of claim 4 wherein the at least one of the plurality of elongated tubes further includes an undulating end surface at the second end of the tube and inside the ring.

6. The system of claim 5 wherein the at least one of the plurality of elongated tubes further includes a solder joint at the undulating end surface and inside the ring.

7. The system of claim 1, wherein at least one of the first and second tabs of each tube further includes a detent configured as a protrusion that extends from the respective first or second tab.

8. The system of claim 1 wherein the first and second notches of each tube are diametrically opposed across the first end of the tube.

9. The system of claim 1 wherein a bridge is positioned between each pair of first and second apertures.

10. The system of claim 1, wherein the wall board is one of a plurality of wall boards, wherein top ends of the plurality of wall boards are inserted into the first elongated channel to form a barrier wall.

11. The system of claim 1, wherein the elongated vent element includes:

a first piece having a first upper portion, a first middle portion and a first lower portion; and a second piece having a second upper portion, a second middle portion and a second lower portion;

wherein the second elongated channel is defined by the first upper portion and the second upper portion.

12. The system of claim 11, wherein the second piece is a mirror image of the first piece.

13. The system of claim 11, wherein the first and second pieces are joined together at their respective first and second middle portions.

14. The system of claim 11, wherein each of the first and second middle portions includes a plurality of openings therethrough.

15. The system of claim 14, wherein a combined area of the plurality of openings includes at least about 25% of an area of the first middle portion.

16. The system of claim 11, wherein the first and second lower portions form a third channel.

17. The system of claim 11, further including a hook located on at least one of the first and second middle portions.

18. The system of claim 11, wherein at least a part of the first lower portion extends at an angle from the first middle portion.

* * * * *